(12) United States Patent
Tsurutani

(10) Patent No.: US 12,104,953 B2
(45) Date of Patent: Oct. 1, 2024

(54) SPECTROMETER

(71) Applicant: Konica Minolta, Inc., Tokyo (JP)

(72) Inventor: Katsutoshi Tsurutani, Osaka (JP)

(73) Assignee: Konica Minolta, Inc., Tokyo (JP)

( * ) Notice: Subject to any disclaimer, the term of this patent is extended or adjusted under 35 U.S.C. 154(b) by 287 days.

(21) Appl. No.: 17/620,978

(22) PCT Filed: Jun. 26, 2020

(86) PCT No.: PCT/JP2020/025177
§ 371 (c)(1),
(2) Date: Dec. 20, 2021

(87) PCT Pub. No.: WO2021/002286
PCT Pub. Date: Jan. 7, 2021

(65) Prior Publication Data
US 2022/0357199 A1   Nov. 10, 2022

(30) Foreign Application Priority Data

Jul. 4, 2019  (JP) .............................. JP2019-125273

(51) Int. Cl.
*G01J 3/02* (2006.01)
*G01J 3/18* (2006.01)

(52) U.S. Cl.
CPC ................ *G01J 3/027* (2013.01); *G01J 3/18* (2013.01)

(58) Field of Classification Search
CPC ...... G01J 3/0213; G01J 3/0229; G01J 3/0248; G01J 3/027; G01J 3/0297; G01J 3/18
See application file for complete search history.

(56) References Cited

U.S. PATENT DOCUMENTS

| 2011/0108720 A1* | 5/2011 | Ford | G01N 21/274 250/262 |
| 2012/0228519 A1* | 9/2012 | Gilmore | G01N 33/18 356/432 |
| 2019/0107786 A1* | 4/2019 | Van Boxmeer | G03F 7/70625 |

FOREIGN PATENT DOCUMENTS

| CN | 1949022 A | 4/2007 |
| JP | S62-050641 A | 3/1987 |
| JP | S62-50641 A | 3/1987 |
| JP | S63-117234 A | 5/1988 |
| JP | 2001-264166 A | 9/2001 |

(Continued)

OTHER PUBLICATIONS

PCT, International Search Report for the corresponding application No. PCT/JP2020/025177, dated Aug. 25, 2020, with English translation.

(Continued)

*Primary Examiner* — Hina F Ayub
(74) *Attorney, Agent, or Firm* — LUCAS & MERCANTI, LLP

(57) ABSTRACT

A spectrometer includes: a diffraction means that diffracts light being measured which has entered via an entrance unit; a main sensor that receives the light being measured which has been diffracted by the diffraction means; at least one auxiliary sensor disposed in an optical path of a luminous flux that does not reach the main sensor among luminous fluxes that have entered via the entrance unit, the auxiliary sensor receiving the luminous flux; and a correction means that corrects an output value of the main sensor on the basis of an output value of the auxiliary sensor.

15 Claims, 18 Drawing Sheets

(56) References Cited

FOREIGN PATENT DOCUMENTS

| JP | 2002-206967 A | 7/2002 |
|---|---|---|
| JP | 2004-037282 A | 2/2004 |
| JP | 2013-168512 A | 8/2013 |
| JP | 2016-114544 A | 6/2016 |

OTHER PUBLICATIONS

PCT, Written Opinion for the corresponding application No. PCT/JP2020/025177, dated Aug. 25, 2020, with English translation.
Office Action dated Apr. 15, 2023, for the corresponding Chinese Application No. 202080046919.8, with English translation.
Office Action dated Dec. 12, 2023, for the corresponding Japanese Application No. 2021-529994, with English translation.
Office Action dated Mar. 4, 2024, for the corresponding Chinese Application No. 202080046919.8, with English translation, 15 pages.

* cited by examiner

SPECTROMETER

CROSS REFERENCE TO RELATED APPLICATION

This Application is a 371 of PCT/JP2020/025177 filed on Jun. 26, 2020 which, in turn, claimed the priority of Japanese Patent Application No. 2019-125273 filed on Jul. 4, 2019, both applications are incorporated herein by reference.

TECHNICAL FIELD

The present invention relates to a spectrometer used for measuring luminance and chromaticity of a light source, spectral reflectance or a color value of an object, and the like.

BACKGROUND ART

As the spectrometer as described above, there has been conventionally known a device that guides light being measured from a measurement area such as a light source to an entrance slit as an entrance unit via an optical system such as an objective lens, an aperture stop, and a condenser relay lens, diffracts and disperses the light being measured that has entered via the entrance slit by a diffraction means such as a diffraction grating, and receives the diffracted light by a light receiving sensor, thereby obtaining a measurement value. In addition, a device including, instead of or together with the entrance slit, a bundle fiber that guides light being measured which has been condensed by a condenser relay lens to an entrance position is also known (see, for example, Patent Literatures 1 and 2).

In such a spectrometer, the accuracy of the light receiving sensor itself may change due to a change in measurement environment or time degradation. In addition, an optical system component may be disposed in a path of light being measured from the entrance unit such as an entrance slit or a bundle fiber to which the light being measured is incident to the light receiving sensor that receives the light being measured. In such configuration, if the optical system component has a change in transmittance due to environmental conditions, time degradation, or the like, highly accurate measurement cannot also be performed. The optical system component will be described as follows.

Examples of the optical system component include light reducing members such as an ND filter, a liquid crystal shutter, and a diffusion plate, and optical filters such as an infrared cut filter and an ultraviolet cut filter that cut a wavelength band other than the measurement wavelength range (for example, 380 to 780 nm). Examples of the ND filter include an ND filter obtained by depositing a metal film (for example, chromium) on a glass substrate, an ND filter using an interference film, and a color absorption filter.

The light reducing member described above is used to enable measurement with a wide dynamic range. That is, in a case where the spectrometer is a luminance meter and the dynamic range of a light receiving sensor is narrower than the luminance range to be measured by the luminance meter, the intensity of light to be received is controlled by automatically or manually inserting or retracting the light reducing member into or from the optical path according to the luminance of an object for measurement, thereby enabling measurement with a wide dynamic range.

Specifically, suppose that measurement with a luminance range of 0.0005 to 100000 cd/m² is performed. In this case, if a typical silicon sensor is used for the light receiving sensor, the dynamic range is about five million times. Therefore, measurement with a luminance range of 0.0005 to 250 cd/m² can be performed without using a light reducing member, measurement with a luminance range up to 5000 cd/m² can be performed with one ND filter having a transmittance of 5% being inserted into the optical path as a light reducing member, and measurement with a luminance range up to 100000 cd/m² can be performed with two ND filters each having a transmittance of 5% (transmittance of 0.25% (5%×5%)) being inserted into the optical path.

However, the light reducing member may deteriorate with age due to a change in transmittance by the temperature in an environment where it is used, storage in a high temperature/high humidity environment, light exposure, and the like, and thus, it may be impossible to perform highly accurate measurement. For example, when the light reducing member having a transmittance of 5% changes only by 0.1% in terms of an absolute value of the transmittance, an error of 2% occurs in light reception data in terms of a relative value.

In addition, in the ND filter using a vapor deposited metal film, the transmittance tends to increase over time due to the oxidation of the film. In the ND filter using an interference film, the transmittance depends on the inclination with respect to an optical path. The inclination of the filter changes depending on the reproducibility of inserting or retracting the filter into or from the optical path and the orientation of the spectrometer, and therefore, the transmittance may greatly vary. The absorption color filter, the liquid crystal shutter, the diffusion plate, and the like have a great change in transmittance due to the environmental temperature, and further have a different change in transmittance for each wavelength. This affects the chromaticity value.

Besides the light reducing member, the optical filter is also likely to have a change in transmittance due to the environmental temperature, and thus, it is likely that the measurement with high accuracy cannot be performed.

As described above, there is a problem that, when the accuracy of the light receiving sensor itself changes due to a change in measurement environment or time degradation, highly accurate measurement cannot be performed. In addition, there is a problem that, in a case where an optical system component, which is disposed in a path of light being measured from an entrance unit such as an entrance slit or a bundle fiber to which the light being measured is incident to the light receiving sensor, has a change in transmittance due to environmental conditions, time degradation, or the like, highly accurate measurement cannot also be performed.

Note that Patent Literature 2 discloses, as a spectrometer that effectively uses zeroth order diffracted light, a spectrometer including: a diffraction means that spectrally disperses light being measured; a first photoelectric conversion element that receives zeroth order diffracted light from the diffraction means; and a second photoelectric conversion element that receives higher order diffracted light from the diffraction means, the spectrometer controlling an integration time in the second photoelectric conversion element on the basis of a light reception output of the zeroth order diffracted light photoelectrically converted by the first photoelectric conversion element.

CITATION LIST

Patent Literature

Patent Literature 1: JP 2001-264166 A
Patent Literature 2: JP 2004-37282 A

SUMMARY OF INVENTION

Technical Problem

However, the spectrometer disclosed in Patent Literature 2 controls the integration time in the light receiving sensor on the basis of the light reception output of the zeroth order diffracted light, and does not correct the output value of the light receiving sensor. Therefore, Patent Literature 2 does not provide a solution to the problem that, in a case where the accuracy of the light receiving sensor itself changes, or where an optical system component, which is disposed in a path of light being measured from an entrance unit such as an entrance slit or a bundle fiber to which the light being measured is incident to the light receiving sensor, has a change in transmittance due to environmental conditions, time degradation, or the like, highly accurate measurement cannot be performed.

The present invention has been accomplished in view of such a technical background, and an object of the present invention is to provide a spectrometer capable of performing highly accurate measurement even in a case where the accuracy of a light receiving sensor itself changes or in a case where the transmittance of an optical system component interposed in a path of light being measured from an entrance unit such as an entrance slit or a bundle fiber to which the light being measured is incident to the light receiving sensor changes due to environmental conditions, time degradation, or the like.

Solution to Problem

The above object is achieved by the following means.

(1) A spectrometer including: a diffraction means that diffracts light being measured which has entered via an entrance unit; a main sensor that receives the light being measured which has been diffracted by the diffraction means; at least one auxiliary sensor disposed in an optical path of a luminous flux that does not reach the main sensor among luminous fluxes that have entered via the entrance unit, the auxiliary sensor receiving the luminous flux; and a correction means that corrects an output value of the main sensor on the basis of an output value of the auxiliary sensor.

(2) The spectrometer according to item 1, wherein the correction means corrects the output value of the main sensor such that a received light intensity value calculated from the output value of the main sensor is equal to a received light intensity value calculated from the output value of the auxiliary sensor.

(3) The spectrometer according to item 1 or 2, further including a received-light-quantity adjustment member for adjusting a quantity of light received by the main sensor.

(4) The spectrometer according to item 3, wherein the received-light-quantity adjustment member is a light reducing member disposed to be insertable into and retractable from an optical path of the light being measured.

(5) The spectrometer according to item 3 or 4, wherein the auxiliary sensor is disposed in front of the received-light-quantity adjustment member, and the correction means simultaneously acquires the output value of the main sensor and the output value of the auxiliary sensor, and corrects the output value of the main sensor.

(6) The spectrometer according to item 4, wherein a first auxiliary sensor is disposed behind the light reducing member, and the correction means acquires the output value of the main sensor in a state where the light reducing member is inserted into the optical path, acquires an output value of the first auxiliary sensor in a state where the light reducing member is retracted from the optical path, and corrects the output value of the main sensor.

(7) The spectrometer according to item 6, wherein a second auxiliary sensor is disposed in front of the light reducing member, and the correction means respectively acquires output values of the second auxiliary sensor at a timing at which the output value of the main sensor is acquired and at a timing at which the output value of the first auxiliary sensor is acquired, calculates a temporal rate of change of light quantity from a ratio of the acquired output values of the second auxiliary sensor, and corrects a temporal change in light quantity on the basis of the calculated rate of change of light quantity.

(8) The spectrometer according to item 3 or 4, wherein a first auxiliary sensor and a second auxiliary sensor are respectively disposed in front of and behind the received-light-quantity adjustment member, and the correction means simultaneously acquires output values of the main sensor, the first auxiliary sensor, and the second auxiliary sensor, and corrects the output value of the main sensor on the basis of a rate of change of a ratio between the acquired output values of the first auxiliary sensor and the second auxiliary sensor from a reference value.

(9) The spectrometer according to item 4, wherein a first auxiliary sensor is disposed behind the light reducing member, and the correction means simultaneously acquires the output value of the main sensor and an output value of the first auxiliary sensor in a state where the light reducing member is inserted into the optical path, acquires an output value of the first auxiliary sensor in a state where the light reducing member is retracted from the optical path, and corrects the output value of the main sensor on the basis of a ratio of the acquired output values of the first auxiliary sensor.

(10) The spectrometer according to item 9, wherein a second auxiliary sensor is disposed in front of the light reducing member, and the correction means acquires twice an output value of the second auxiliary sensor at timings same as the timings at which the output values of the first auxiliary sensor are acquired, calculates a temporal rate of change of light quantity from a ratio of the acquired two output values of the second auxiliary sensor, and corrects a temporal change in light quantity on the basis of the calculated rate of change of light quantity.

(11) The spectrometer according to any one of items 1 to 10, wherein the auxiliary sensor receives a luminous flux that is not emitted to the diffraction means among luminous fluxes that have entered via the entrance unit.

(12) The spectrometer according to any one of items 1 to 10, wherein the auxiliary sensor receives zeroth order diffracted light.

(13) The spectrometer according to any one of items 1 to 12, wherein the auxiliary sensor includes a plurality of auxiliary sensors having different light quantity ranges of receivable light.

(14) The spectrometer according to any one of items 1 to 13, further including an aperture stop that controls a quantity of light received by the auxiliary sensor.

(15) The spectrometer according to any one of items 1 to 13, further including an optical filter that controls a quantity of light received by the auxiliary sensor.

(16) The spectrometer according to any one of items 1 to 15, wherein the auxiliary sensor includes an optical filter having light sensitivity set to a standard luminous efficiency function.

Advantageous Effects of Invention

According to the invention described in item (1), the main sensor receives light being measured that has entered via the entrance unit and diffracted by the diffraction means. At least one auxiliary sensor disposed in an optical path of a luminous flux that does not reach the main sensor among luminous fluxes entering via the entrance unit is provided, the auxiliary sensor receiving the luminous flux, and an output value of the main sensor is corrected on the basis of an output value of the auxiliary sensor. Therefore, even in a case where the accuracy of the main sensor serving as a light receiving sensor changes, or even in a case where the transmittance of an optical system component interposed in the path of the light being measured from the entrance unit such as an entrance slit or a bundle fiber to the light receiving sensor changes due to environmental conditions, time degradation, or the like, it is possible to compensate for a change in the accuracy of the main sensor and a change in the transmittance of the optical system component, and to perform highly accurate measurement. Moreover, since the auxiliary sensor is disposed in the optical path of the luminous flux that does not reach the main sensor, the auxiliary sensor can correct the output value of the main sensor without affecting the measurement by the main sensor.

According to the invention described in item (2), the output value of the main sensor is corrected such that the received light intensity value calculated from the output value of the main sensor is equal to a received light intensity value calculated from the output value of the auxiliary sensor, whereby it is possible to reliably compensate for the change in accuracy of the main sensor and the change in transmittance of the optical system component.

According to the invention described in item (3), the output value of the main sensor is corrected on the basis of the output value of the auxiliary sensor even when the transmittance or the like of the received-light-quantity adjustment member for adjusting a quantity of light received by the main sensor changes, and thus, it is possible to perform highly accurate measurement.

According to the invention described in item (4), the output value of the main sensor is corrected on the basis of the output value of the auxiliary sensor even when the transmittance or the like of the light reducing member disposed to be insertable into and retractable from the optical path of the light being measured changes. Thus, it is possible to perform highly accurate measurement.

According to the invention described in item (5), it is possible to collectively correct the change in transmittance of the received-light-quantity adjustment member and the change in accuracy of the main sensor.

According to the invention described in item (6), it is possible to collectively correct the change in transmittance of the light reducing member and the change in accuracy of the main sensor. The invention described in item (6) is particularly effective when a space for disposing the auxiliary sensor cannot be ensured in front of the light reducing member.

According to the invention described in item (7), in addition to the effect of item (6), it is possible to perform more highly accurate measurement by correcting a temporal change in light quantity caused by a difference between the timing at which the output value of the main sensor is acquired and the timing at which the output value of the first auxiliary sensor is acquired.

According to the invention described in item (8), it is possible to compensate for a change in transmittance of the received-light-quantity adjustment member due to environmental conditions, time degradation, or the like, whereby highly accurate measurement can be performed.

According to the invention described in item (9), it is possible to compensate for a change in transmittance of the received-light-quantity adjustment member due to environmental conditions, time degradation, or the like, whereby highly accurate measurement can be performed. The invention described in item (9) is particularly effective when a space for disposing the auxiliary sensor cannot be ensured in front of the light reducing member.

According to the invention described in item (10), in addition to the effect of item (9), it is possible to perform more highly accurate measurement by correcting a temporal change in light quantity caused by a difference between the timing at which the output value of the main sensor is acquired and the timing at which the output value of the first auxiliary sensor is acquired.

According to the invention described in item (11), the output value of the main sensor can be corrected by the auxiliary sensor at the position where the luminous flux that is not emitted to the diffraction grating among the luminous fluxes passing through the entrance slit is received.

According to the invention described in item (12), the output value of the main sensor can be corrected on the basis of the output of the auxiliary sensor that has received the zeroth order diffracted light.

According to the invention described in item (13), the auxiliary sensor includes a plurality of auxiliary sensors having different light quantity ranges of receivable light, whereby a dynamic range can be ensured for a measurement luminance range.

According to the invention described in item (14), the quantity of light received by the auxiliary sensor can be controlled by the aperture stop.

According to the invention described in item (15), the quantity of light received by the auxiliary sensor can be controlled by the optical filter.

According to the invention described in item (16), calculation for calculating the luminance of the object for measurement by the output value of the auxiliary sensor is simplified.

DESCRIPTION OF EMBODIMENTS

Embodiments of the present invention will now be described with reference to the drawings.

Figure 1:
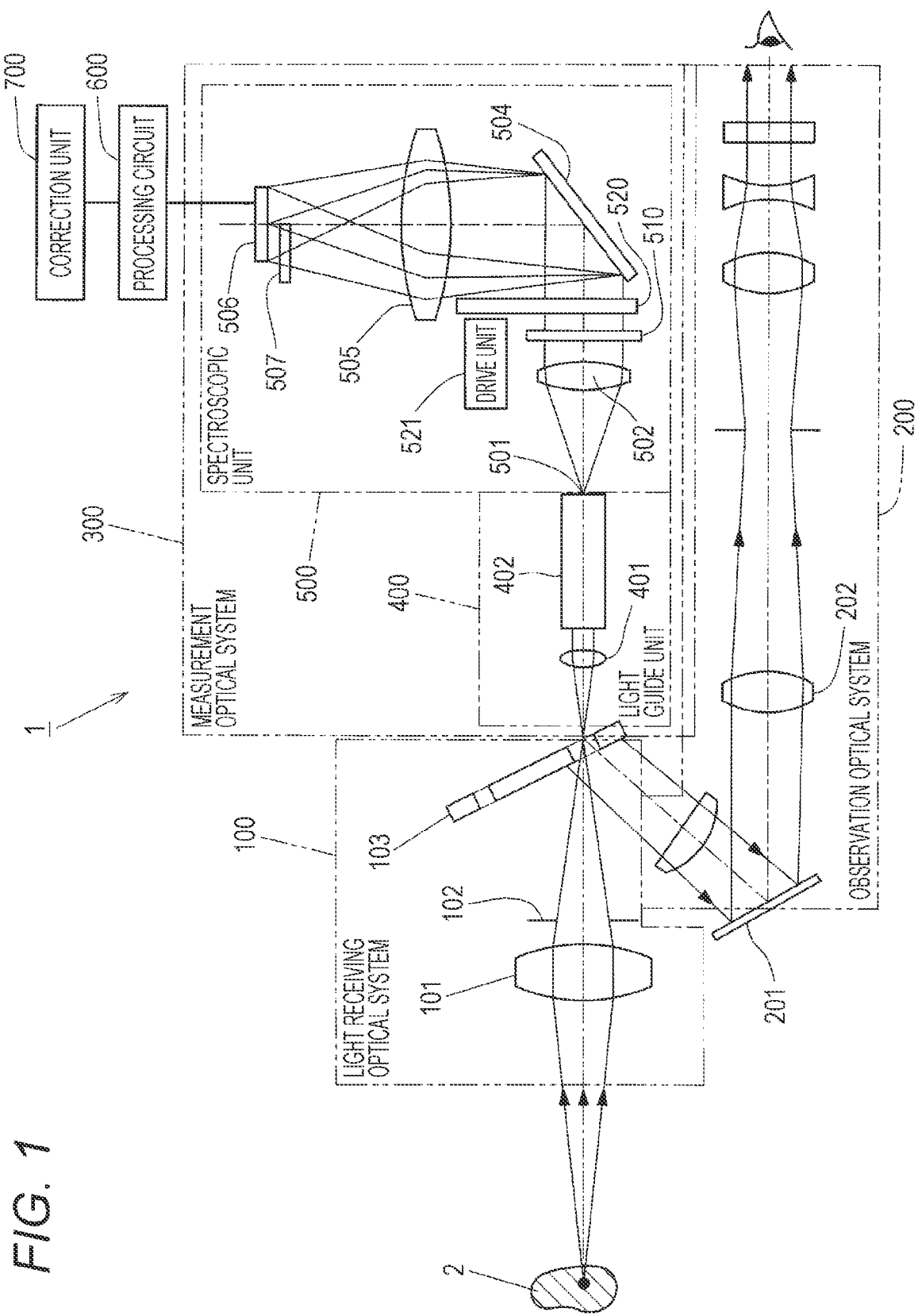
FIG. 1 is a diagram illustrating an example of a basic configuration of a spectrometer according to an embodiment of the present invention.

FIG. 1 is a diagram illustrating a basic configuration of a spectral luminance meter that is the spectrometer according to an embodiment of the present invention. As illustrated in FIG. 1, a spectrometer 1 includes a light receiving optical system 100, an observation optical system 200, a measurement optical system 300, a processing circuit 600, and a correction unit 700, and the measurement optical system 300 further includes a light guide unit 400 and a spectroscopic unit 500.

The light receiving optical system 100 receives luminous fluxes 3 from an object for measurement 2 including a light source and guides the luminous fluxes 3 to the light guide unit 400 of the measurement optical system 300 and the observation optical system 200. The light receiving optical system 100 includes an objective lens 101 that collects the luminous fluxes 3 from the object for measurement 2, an aperture stop 102 for regulating a quantity of light being measured disposed behind the objective lens 101 (ahead of the luminous fluxes 3 in the traveling direction of the luminous fluxes 3), and an aperture mirror 103 disposed behind the aperture stop 102.

The aperture mirror 103 is disposed in an entrance optical path of the luminous fluxes 3 to the light guide unit 400 and has an opening through which the luminous fluxes 3 condensed by the objective lens 101 pass. Among the luminous fluxes from the objective lens 101, luminous fluxes from a photometric area of the object for measurement 2 pass through the opening of the aperture mirror 103 and travel straight to the light guide unit 400 in the subsequent stage, while luminous fluxes outside the photometric area are reflected by the aperture mirror 103, and are guided to the pupil of a user through a reflection mirror 201 and a lens group including an observation relay lens 202 in the observation optical system 200. The user visually recognizes the object for measurement 2 and an index circle (this is a region which is not reflected by the aperture mirror and appears black to the user) via the observation optical system 200, and performs alignment of measurement position and focusing. In focusing, the entire lens group or a part of the lens group of the objective lens 101 is moved to focus on the position of the aperture mirror. The aperture stop 102 does not change the aperture angle (F-number) of measurement light even when focusing is performed. The hole size of the aperture mirror 103 may be manually or automatically changeable. The measurement angle (measurement size) can be changed by changing the hole size.

The light guide unit 400 in the measurement optical system 300 includes a condenser lens 401 that condenses the luminous flux passing through the opening of the aperture mirror 103, and a bundle fiber 402 that guides the luminous flux passing through the condenser lens 401 to an entrance slit 501 of the spectroscopic unit 500. In this embodiment, an outlet of the bundle fiber 402 and the entrance slit 501 are shared as an entrance unit. Note that at least one of the bundle fiber 402 and the entrance slit 501 may be provided.

The spectroscopic unit 500 in the measurement optical system 300 includes a collimator lens 502 that substantially collimates the luminous flux entering via the entrance slit 501, a diaphragm (illustrated in FIGS. 2 to 4) 503 having a rectangular opening 503a disposed behind the collimated light from the collimator lens 502, a diffraction grating 504 that diffracts the collimated light having passed through the opening 503a of the diaphragm 503, an image-forming lens 505, a main sensor 506 that is a light receiving sensor, a secondary light cut filter 507 disposed partially in front of the main sensor 506, and the like.

The diaphragm 503 regulates a quantity of the collimated light from the collimator lens 502 in accordance with the size of the diffraction grating 504, and the image-forming lens 505 focuses the wavelength dispersed light beam by the diffraction grating 504 on the main sensor 506. The diaphragm 503 is highly reliable because it is resistant to environmental changes and temporal changes, and is not affected by wavelength dependency, inclination (light beam incident angle) dependency, or the like of light.

The main sensor 506 includes, but is not limited to, a line sensor, and can receive light in a wavelength range of 380 to 780 nm, for example.

In the present embodiment, other optical system components are disposed in the optical path between the collimator lens 502 and the diaphragm 503. In the present embodiment, an optical filter which is one of received-light-quantity adjustment members, for example, an infrared cut filter 510 for cutting infrared light, and a light reducing member 520 which is also one of the received-light-quantity adjustment members are disposed as the optical system components, the light reducing member 520 being disposed behind the infrared cut filter 510. Note that only one of the infrared cut filter 510 and the light reducing member 520 may be disposed, or both of them may not be disposed. In addition, one light reducing member 520 may be provided, or a plurality of light reducing members 520 may be provided in the optical path.

As described in the background art, the light reducing member 520 is used to enable measurement with a wide dynamic range, and includes an ND filter, a liquid crystal shutter, a diffusion plate, and the like. The light reducing member 520 is driven to be insertable into and retractable from the optical path by a drive unit 521, and is inserted into the optical path only when necessary to allow the light being measured from the collimator lens 502 to pass therethrough.

On the other hand, when the infrared cut filter 510 is used, the infrared cut filter is fixed in place and is not driven to be inserted and retracted, unlike the light reducing member 520. Therefore, there is no problem with the inclination reproducibility that may occur in the light reducing member 520. Note that a fixed light reducing member 520 may be used.

Figure 2:
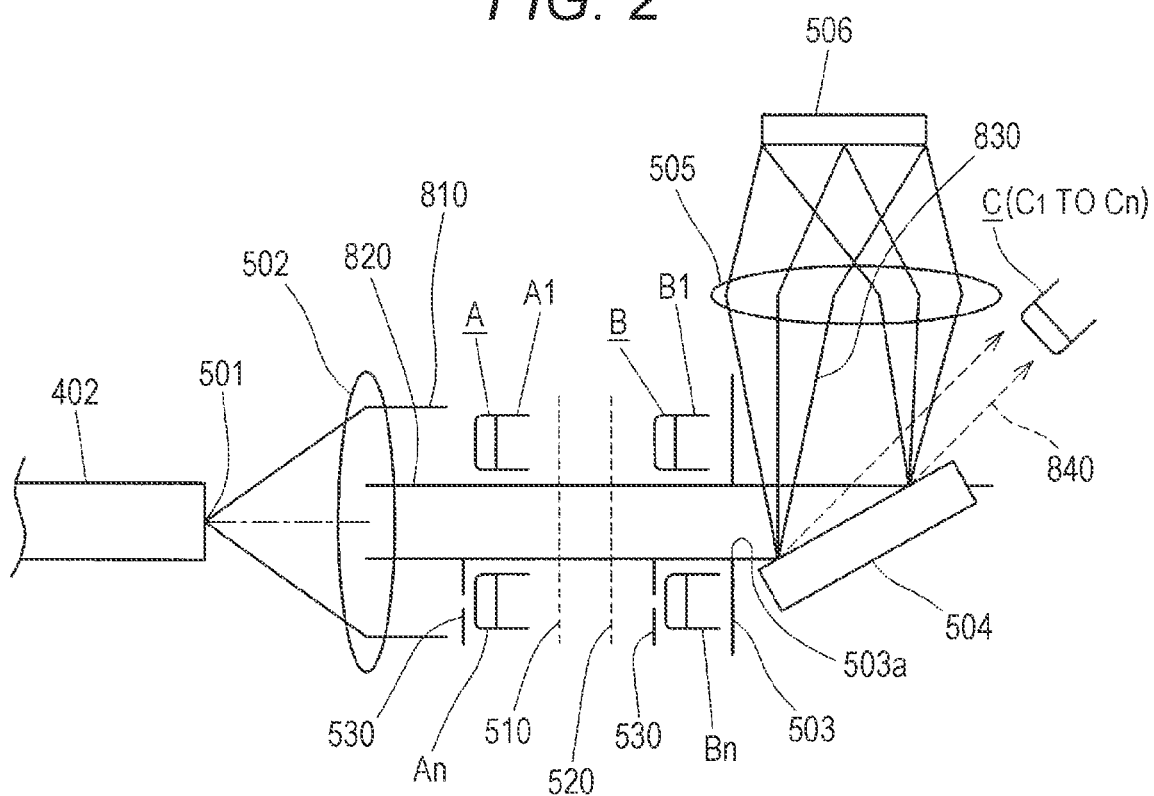
FIG. 2 is a diagram illustrating a detailed configuration of a spectroscopic unit in the spectrometer in FIG. 1.

Furthermore, in the present embodiment, the spectroscopic unit 500 is provided with one or a plurality of auxiliary sensors A, B, and C including a light receiving sensor as illustrated in FIG. 2. In the following description, one or a plurality of sensors will be collectively referred to as an auxiliary sensor A, an auxiliary sensor B, and an auxiliary sensor C according to the arrangement position of the auxiliary sensor. When it is necessary to refer to a plurality of auxiliary sensors, the auxiliary sensors are referred to as auxiliary sensors A1 to An, auxiliary sensors B1 to Bn, and auxiliary sensors C1 to Cn.

For these auxiliary sensors A, B, and C, highly reliable sensors that are resistant to environmental temperature and temporal change, such as silicon photodiodes (SPD), are used. The auxiliary sensors A, B, and C are used to correct the output value of the main sensor 506 on the basis of the output values of the auxiliary sensors, and are disposed in an optical path of a luminous flux that is light under the same condition as the light being measured that enters the spectroscopic unit 500 from the light guide unit 400 and is received by the main sensor 506 but does not reach the main sensor 506.

Figure 3:
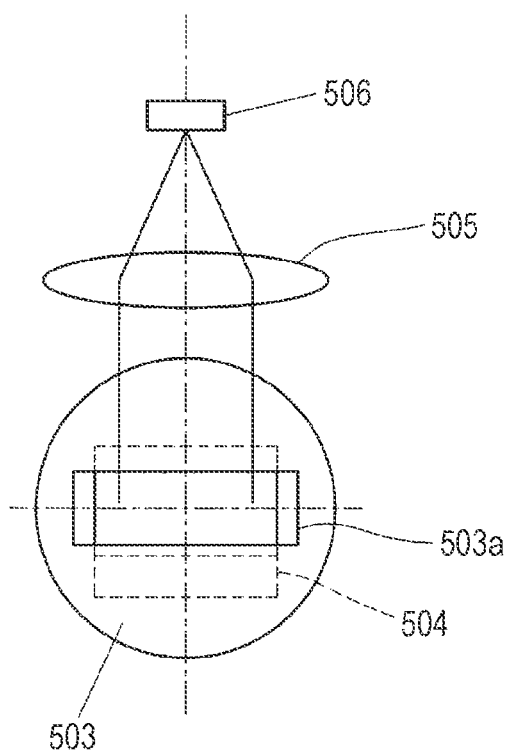
FIG. 3 is a schematic diagram of a diffraction grating in the spectroscopic unit in FIG. 2 as viewed from a front side of a diaphragm.
Figure 4:
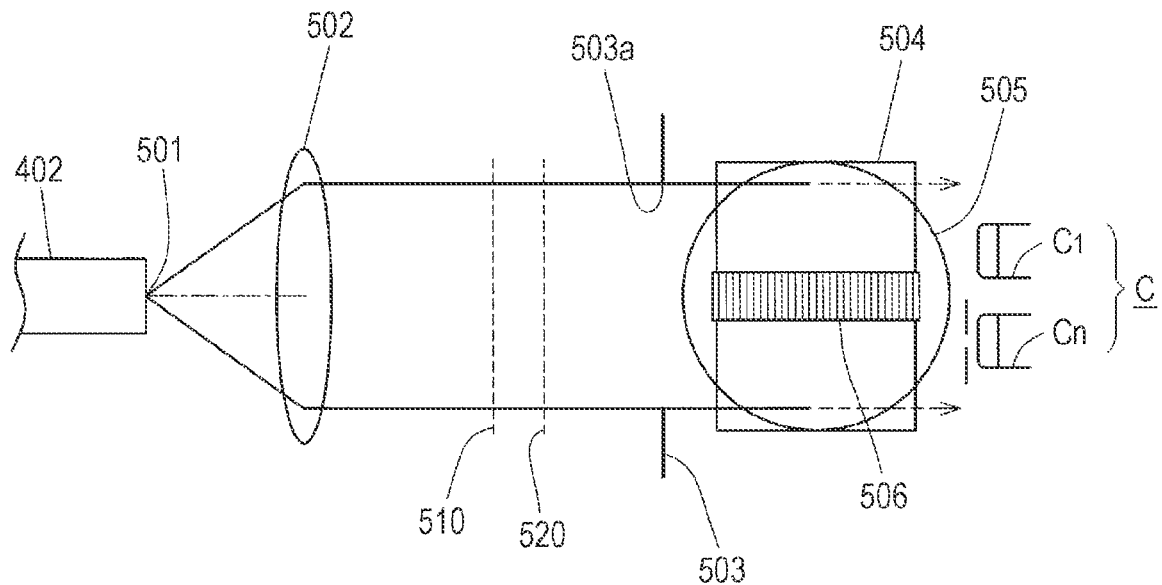
FIG. 4 is a plan view of the spectroscopic unit in FIG. 2.

For example, in the example illustrated in FIG. 2, one or more auxiliary sensors A are disposed between the collimator lens 502 and the infrared cut filter 510, and one or more auxiliary sensors B are disposed between the light reducing member 520 and the diaphragm 503. The luminous fluxes entering the spectroscopic unit 500 are collimated by the collimator lens 502 and are emitted to the diffraction grating 504. Since the diffraction grating 504 is inclined with respect to the optical axis of the collimator lens 502, only a part of the luminous fluxes having passed through the opening 503a of the diaphragm 503 among light 810 having passed through the collimator lens 502 is emitted to the diffraction grating 504 as light being measured 820, and the luminous fluxes deviating from the surface of the diffraction grating 504 are blocked by the diaphragm 503 and do not reach the main sensor 506 as illustrated in FIGS. 3 and 4. The auxiliary sensors A and B are disposed at positions where the auxiliary sensors A and B can receive luminous fluxes blocked by the diaphragm 503, that is, luminous fluxes that are wasted without being used for measurement by the main sensor 506.

Furthermore, as illustrated in FIGS. 2 and 4, one or a plurality of auxiliary sensors C may be disposed at positions where the auxiliary sensors C can receive zeroth order diffracted light 840 diffracted by the diffraction grating 504. The light reception data (minus first order diffracted light 830) by the main sensor 506 and the zeroth order diffracted light 840 are luminous fluxes divided into different orders by the diffraction grating 504, and obtained under the same conditions (have the same characteristics depending on the object for measurement 2). The minus first order diffracted light 830 is acquired as spectral data, but light of the other orders is not used for measurement. In other words, the auxiliary sensor C receives luminous fluxes that are blocked and are wasted. The zeroth order diffracted light 840 has information of all wavelengths in the measurement wavelength range of 380 to 780 nm and has high light intensity.

Although the auxiliary sensors A, B, and C are provided at three positions as illustrated in FIGS. 2 and 4, the auxiliary sensors A, B, and C need not be provided at all positions, and may be provided at necessary positions according to the correction processing as in embodiments described later.

When the dynamic range is insufficient with respect to the measurement luminance range of the main sensor 506 with one auxiliary sensor A, one auxiliary sensor B, and one auxiliary sensor C, a plurality of auxiliary sensors A1 to An, B1 to Bn, and C1 to Cn may be used, and the range may be shared by each of the auxiliary sensors. In the example illustrated in FIG. 2, a plurality of auxiliary sensors A1 to An and a plurality of auxiliary sensors B1 to Bn are respectively disposed at positions between the collimator lens 502 and the infrared cut filter 510 and between the light reducing member 520 and the diaphragm 503 around the optical path of light being measured 820. In addition, at least one of the auxiliary sensors A1 to An and B1 to Bn and the auxiliary sensors C1 to Cn at positions where the zeroth order diffracted light 840 can be received may be combined.

In order to control the quantity of light received by each of the auxiliary sensors A, B, and C, a mechanical diaphragm member 530 or an optical filter (not illustrated) may be disposed in front of the auxiliary sensors A, B, and C as illustrated in FIG. 2.

The processing circuit 600 illustrated in FIG. 1 performs AD conversion and the like on light reception data by the main sensor 506 and light reception data by the auxiliary sensors A, B, and C, and the correction unit 700 corrects the output value of the main sensor 506 on the basis of the output values of the auxiliary sensors A, B, and C. The correction is performed such that a received light intensity value calculated from the output value of the main sensor 506 is equal to a received light intensity value calculated from the output values of the auxiliary sensors A, B, and C.

Next, specific correction processing of the output value of the main sensor 506 based on the output values of the auxiliary sensors A, B, and C executed in the correction unit 700 will be described.

First Embodiment

Figure 5:
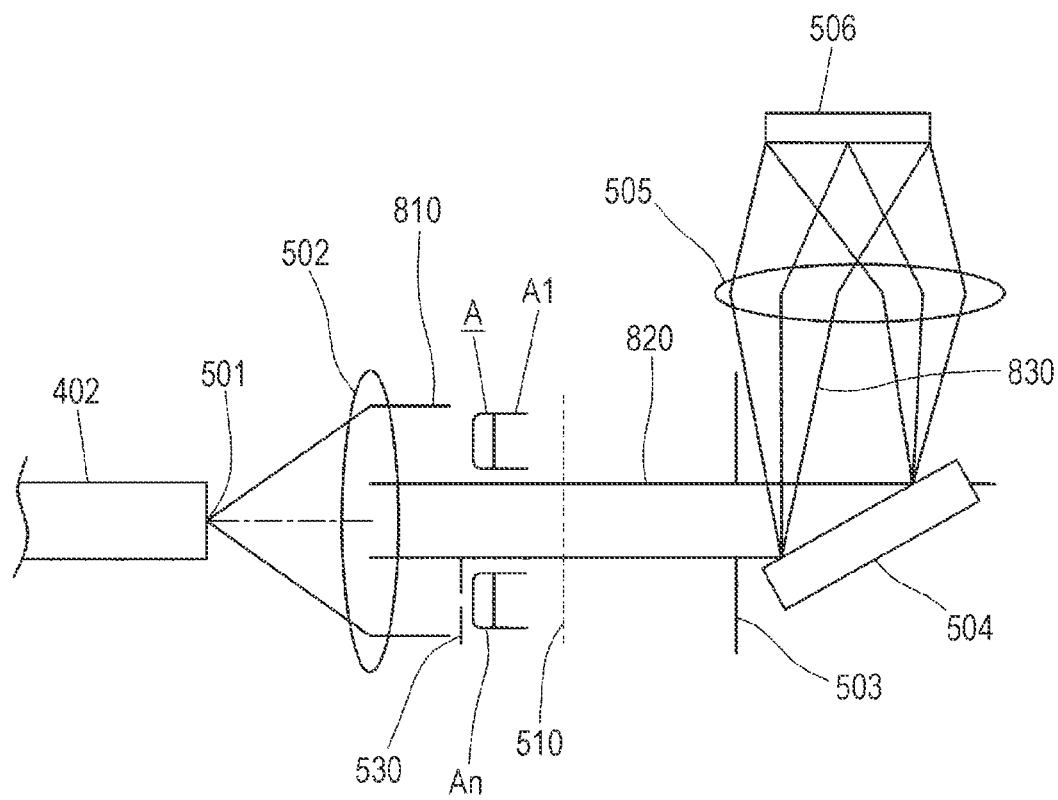
FIG. 5 is a diagram illustrating an arrangement example of auxiliary sensors during correction processing according to a first embodiment.

In this embodiment, the auxiliary sensor A is disposed in front of the infrared cut filter 510, in other words, between the collimator lens 502 and the infrared cut filter 510, as illustrated in FIG. 5. It does not matter whether the light reducing member 520 is provided or not. In the present embodiment, the light reducing member 520 is not provided. One auxiliary sensor A may be used, or a plurality of auxiliary sensors A1 to An corresponding to a dynamic range may be used as in the present embodiment. Each of the auxiliary sensors A1 to An is equipped with an optical filter, and has light sensitivity set to the standard luminous efficiency function (Vλ) in order to facilitate calculation. Note that each of the auxiliary sensors A1 to An may have sensitivity other than the standard luminous efficiency function (Vλ), and may not be equipped with an optical filter. In addition, a table of light reception values and luminance values (Lv) of the auxiliary sensor A is provided.

In this embodiment, an auxiliary sensor Ax, which is one of the auxiliary sensors A1 to An, acquires the absolute value of luminance, and corrects the level of the output value of the main sensor 506. Luminous fluxes are simultaneously received and measured by the auxiliary sensor Ax and the main sensor 506.

Figure 6:
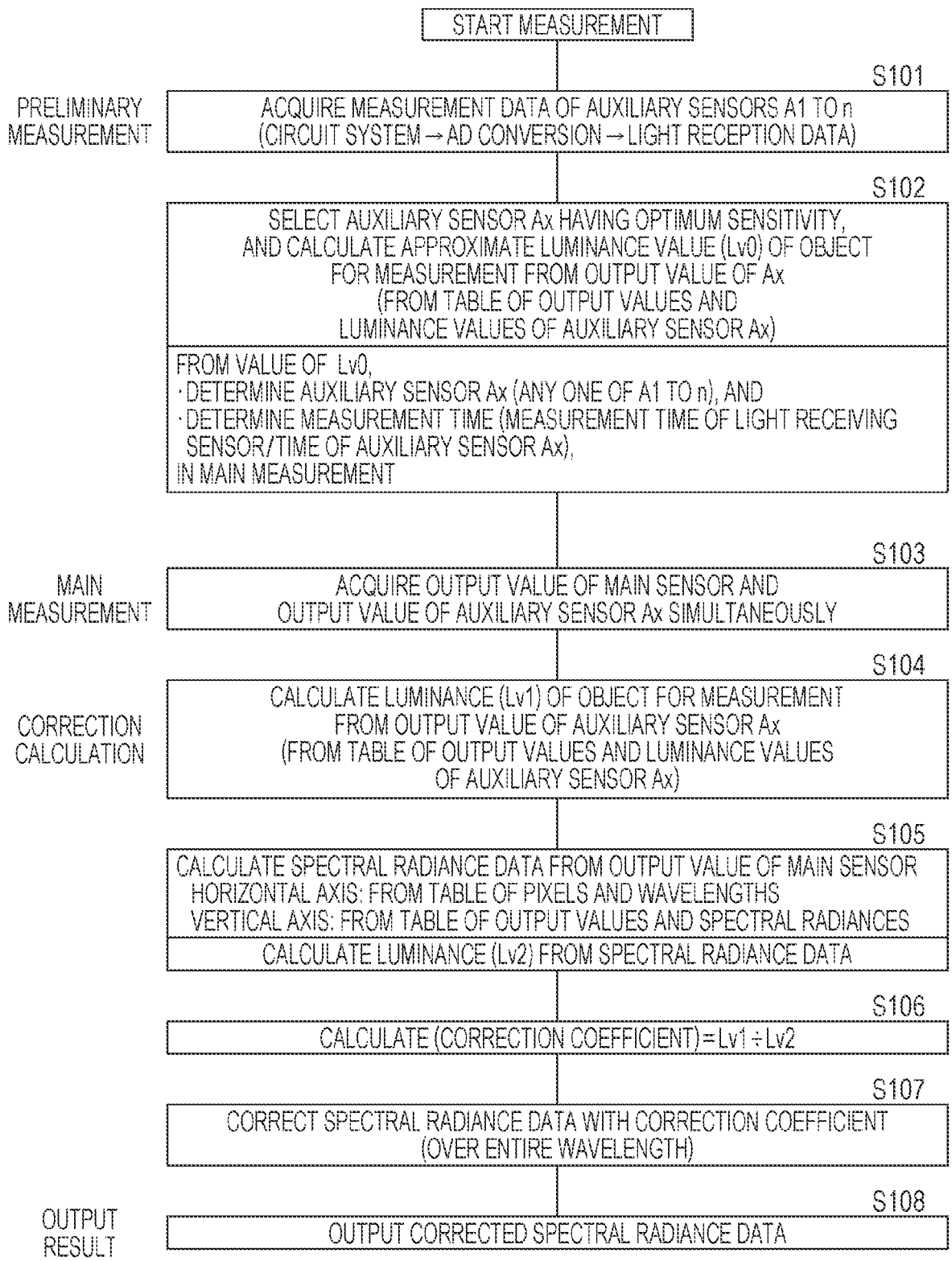
FIG. 6 is a diagram illustrating a flowchart of the correction processing according to the first embodiment.

FIG. 6 is a flowchart of a measurement procedure.

When the measurement is started, as preliminary measurement, the processing circuit 600 performs AD conversion on the light reception data of the plurality of auxiliary sensors A1 to An to acquire measurement data (light reception data) in step S101. Next, in step S102, the auxiliary sensor Ax having optimum sensitivity is selected from the plurality of auxiliary sensors A1 to An, and an approximate luminance value (Lv0) of the object for measurement 2 is calculated from the output value of the auxiliary sensor Ax. The approximate luminance value (Lv0) is calculated by obtaining a luminance value corresponding to the output value of the auxiliary sensor Ax from the table of output values and luminance values (Lv) of the auxiliary sensor Ax. Further, an auxiliary sensor Ax to be used in main measurement is determined from among the auxiliary sensors A1 to An on the basis of the calculated approximate luminance value (Lv0). Typically, the selected auxiliary sensor Ax is also used in the main measurement. Further, measurement times (accumulation times) of the main sensor 506 and the auxiliary sensor Ax in the main measurement are determined.

Next, the main measurement is performed in step S103. Specifically, the output value of the main sensor 506 and the output value of the auxiliary sensor Ax are simultaneously acquired.

Next, the following correction calculation processing is performed. First, in step S104, luminance (Lv1) of the object for measurement is calculated from the output value of the auxiliary sensor Ax. The luminance (Lv1) is calculated on the basis of the table of output values and luminance values of the auxiliary sensor Ax.

Next, in step S105, spectral radiance data is calculated from the output value of the main sensor 506. The horizontal axis of the spectral radiance data is calculated from a table of pixels and wavelengths, and the vertical axis is calculated from a table of output values and spectral radiances. Then, luminance (Lv2) is calculated from the calculated spectral radiance data.

In step S106, an equation of (correction coefficient)= Lv1÷Lv2 is calculated from the luminance (Lv1) calculated in step S104 and the luminance (Lv2) calculated in step S105, and then, in step S107, the spectral radiance data is corrected (multiplied by the correction coefficient) with the correction coefficient over the entire wavelength. Then, in step S108, the corrected spectral radiance data is output to a display device or the like.

As described above, in the present embodiment, the output value of the main sensor 506 is corrected on the basis of the output value of the auxiliary sensor Ax disposed in front of the infrared cut filter 510, so that, even in a case where the transmittance of the infrared cut filter 510 located behind the main sensor 506 has changed due to environmental conditions, time degradation, or the like, or even in a case where the accuracy of the main sensor 506 has changed, it is possible to appropriately correct the output value and perform highly accurate measurement. Moreover, since the auxiliary sensor A is disposed in the optical path of luminous fluxes that do not reach the main sensor 506, the auxiliary sensor A can correct the output value of the main sensor 506 without affecting the measurement by the main sensor 506.

Note that the first embodiment may be applied to a case where the stationary light reducing member 520 is provided without providing the infrared cut filter 510, or a case where the stationary light reducing member 520 is disposed behind the infrared cut filter 510. When the light reducing member 520 is present, the transmittance of the light reducing member 520 is also compensated for.

Second Embodiment

Figure 7:
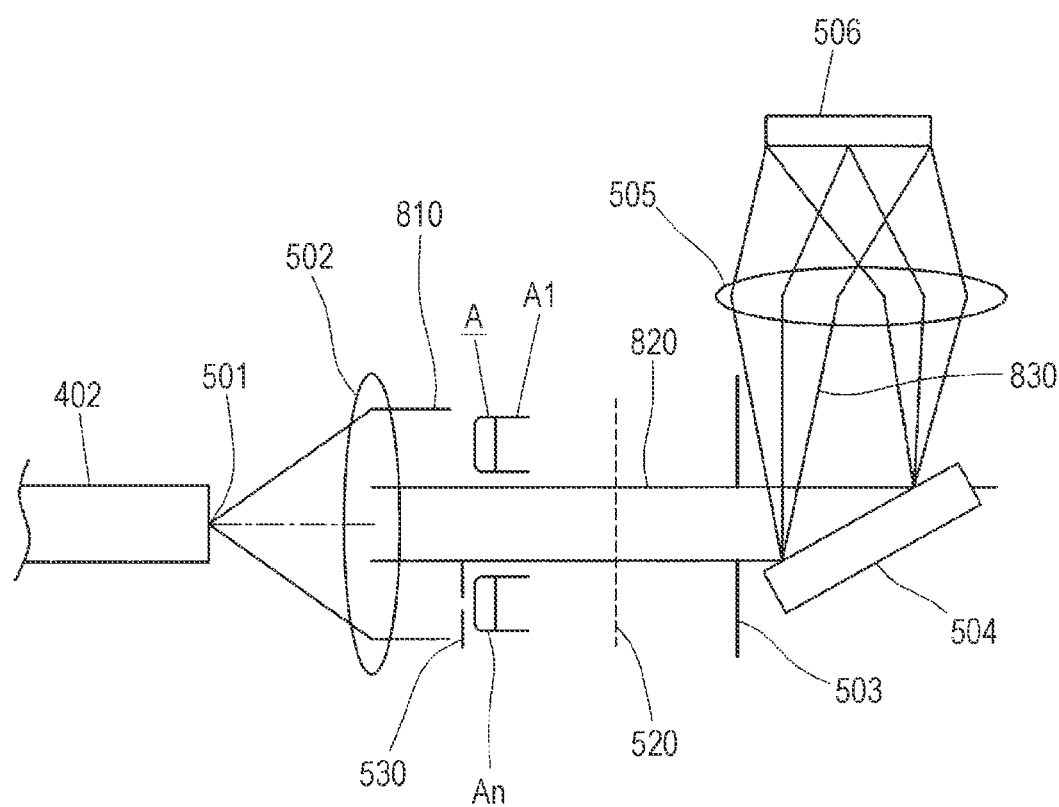
FIG. 7 is a diagram illustrating an arrangement example of auxiliary sensors during correction processing according to a second embodiment.

In this embodiment, as illustrated in FIG. 7, the auxiliary sensor A is disposed in front of the light reducing member 520 which is driven to be insertable into and retractable from the optical path of the light being measured 820. One auxiliary sensor A may be used, or a plurality of auxiliary sensors A1 to An corresponding to a dynamic range may be used as in this embodiment. It does not matter whether the infrared cut filter 510 is provided or not. In the present embodiment, the infrared cut filter 510 is not provided. The auxiliary sensor A is equipped with an optical filter, and has light sensitivity set to the standard luminous efficiency function (Vλ) in order to facilitate calculation. Note that the auxiliary sensor A may have sensitivity other than the standard luminous efficiency function (Vλ), and may not be equipped with an optical filter. In addition, a table of light reception values and luminance values (Lv) of the auxiliary sensor A is provided.

In this embodiment, the auxiliary sensor A acquires the absolute value of luminance, and corrects the level of the output value of the main sensor, as in the first embodiment. Luminous fluxes are simultaneously received and measured by the auxiliary sensor A and the main sensor 506.

Figure 8:
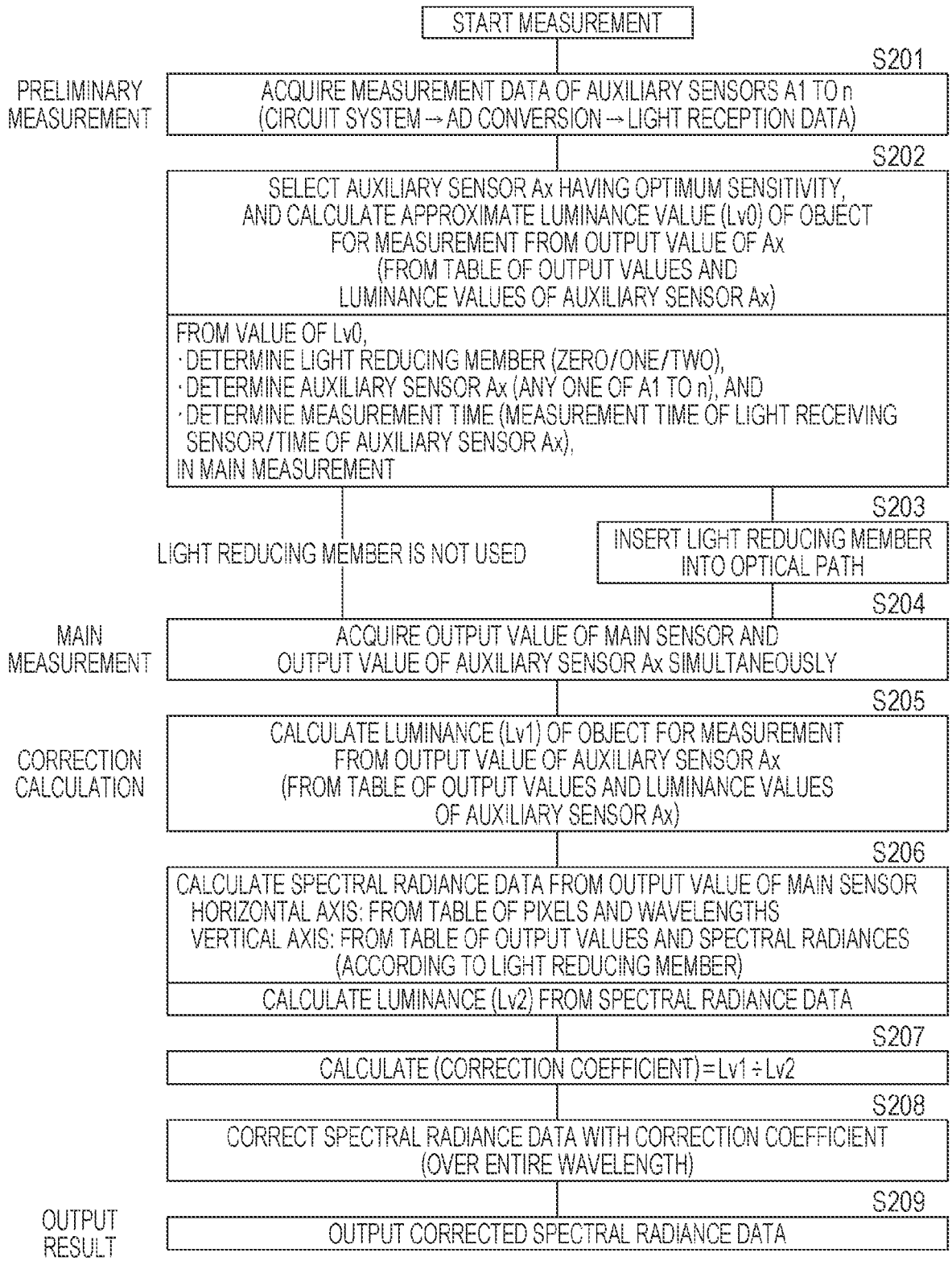
FIG. 8 is a diagram illustrating a flowchart of the correction processing according to the second embodiment.

FIG. 8 is a flowchart of a measurement procedure.

When the measurement is started, preliminary measurement is performed in a state where the light reducing member 520 is retracted from the optical path of the light being measured 820. That is, in step S201, the processing circuit 600 performs AD conversion on light reception data of the plurality of auxiliary sensors A1 to An to acquire measurement data. Next, in step S202, the auxiliary sensor Ax having optimum sensitivity is selected from the plurality of auxiliary sensors A1 to An, and the approximate luminance value (Lv0) of the object for measurement 2 is calculated from the output value of the auxiliary sensor Ax. The approximate luminance value (Lv0) is calculated by obtaining a luminance value corresponding to the output value of the auxiliary sensor Ax from the table of output values and luminance values (Lv) of the auxiliary sensor Ax. Further, from the calculated approximate luminance value (Lv0), whether or not the light reducing member 520 is used in the main measurement and the number of the light reducing members when used are determined, and an auxiliary sensor Ax to be used in the main measurement is determined from the auxiliary sensors A1 to An. Typically, the selected auxiliary sensor Ax is also used in the main measurement. Further, measurement times (accumulation times) of the main sensor 506 and the auxiliary sensor Ax in the main measurement are determined.

Next, the main measurement is performed. When it is determined not to use the light reducing member 520, the processing proceeds to step S204 with the light reducing member 520 being retracted from the optical path. When it is determined to use the light reducing member 520, the determined number of light reducing members 520 is inserted into the optical path in step S203, and then the processing proceeds to step S204.

In step S204, the output value of the main sensor 506 and the output value of the auxiliary sensor Ax are simultaneously acquired.

Next, correction calculation processes in steps S205 to S208 and a process of outputting the result in step S209 are performed. These processes are the same as the correction calculation processes in steps S104 to S107 and the process of outputting the result in step S108 in FIG. 6 described in the first embodiment, and thus, the description thereof will be omitted.

As described above, in the present embodiment, in a case where the light reducing member 520 is not inserted into the optical path of the light being measured 820, it is possible to compensate for a change in accuracy or the like of the main sensor 506, and in a case where the light reducing member 520 is inserted into the optical path, it is possible to compensate for a change in transmittance or the like of the light reducing member 520 in addition to the change in accuracy of the main sensor 506. Accordingly, it is possible to perform highly accurate measurement. Note that, when the infrared cut filter 510 is present behind the auxiliary sensor Ax, a change in transmittance, etc. of the infrared cut filter 510 and a change in transmittance, etc. of the light reducing member 520 can be compensated for together.

Third Embodiment

Figure 9:
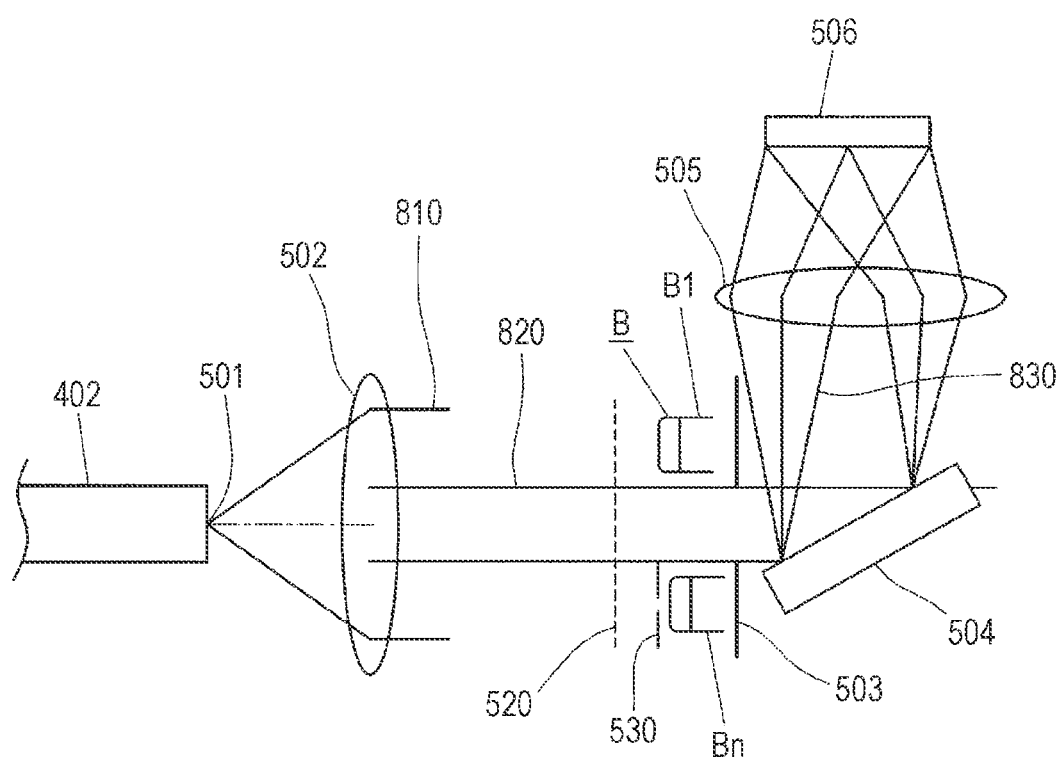
FIG. 9 is a diagram illustrating an arrangement example of auxiliary sensors during correction processing according to a third embodiment.

In this embodiment, as illustrated in FIG. 9, the auxiliary sensor B is disposed behind the light reducing member 520 driven so as to be insertable into and retractable from the optical path of the light being measured 820, in other words, between the light reducing member 520 and the diaphragm 503, or the auxiliary sensor C that receives the zeroth order diffracted light 840 is disposed. In this example, the auxiliary sensor B is used. One auxiliary sensor B may be used, or a plurality of auxiliary sensors B1 to Bn corresponding to the dynamic range may be used as in this embodiment. It does not matter whether the infrared cut filter 510 is provided or not. In the present embodiment, the infrared cut filter 510 is not provided. The auxiliary sensor B is equipped with an optical filter, and has light sensitivity set to the standard luminous efficiency function (Vλ) in order to facilitate calculation. Note that the auxiliary sensor B may have sensitivity other than the standard luminous efficiency function (Vλ), and may not be equipped with an optical filter. In addition, a table of light reception values and luminance values (Lv) of the auxiliary sensor B is provided.

In this embodiment, the auxiliary sensor B acquires the absolute value of luminance, and corrects the level of the output value of the main sensor 506, as in the first embodiment. When the light reducing member 520 is used, the output value of the main sensor 506 is acquired in a state where the light reducing member 520 is inserted into the optical path of the light being measured 820, and the output value of the auxiliary sensor B is acquired in a state where the light reducing member is retracted from the optical path.

Figure 10:
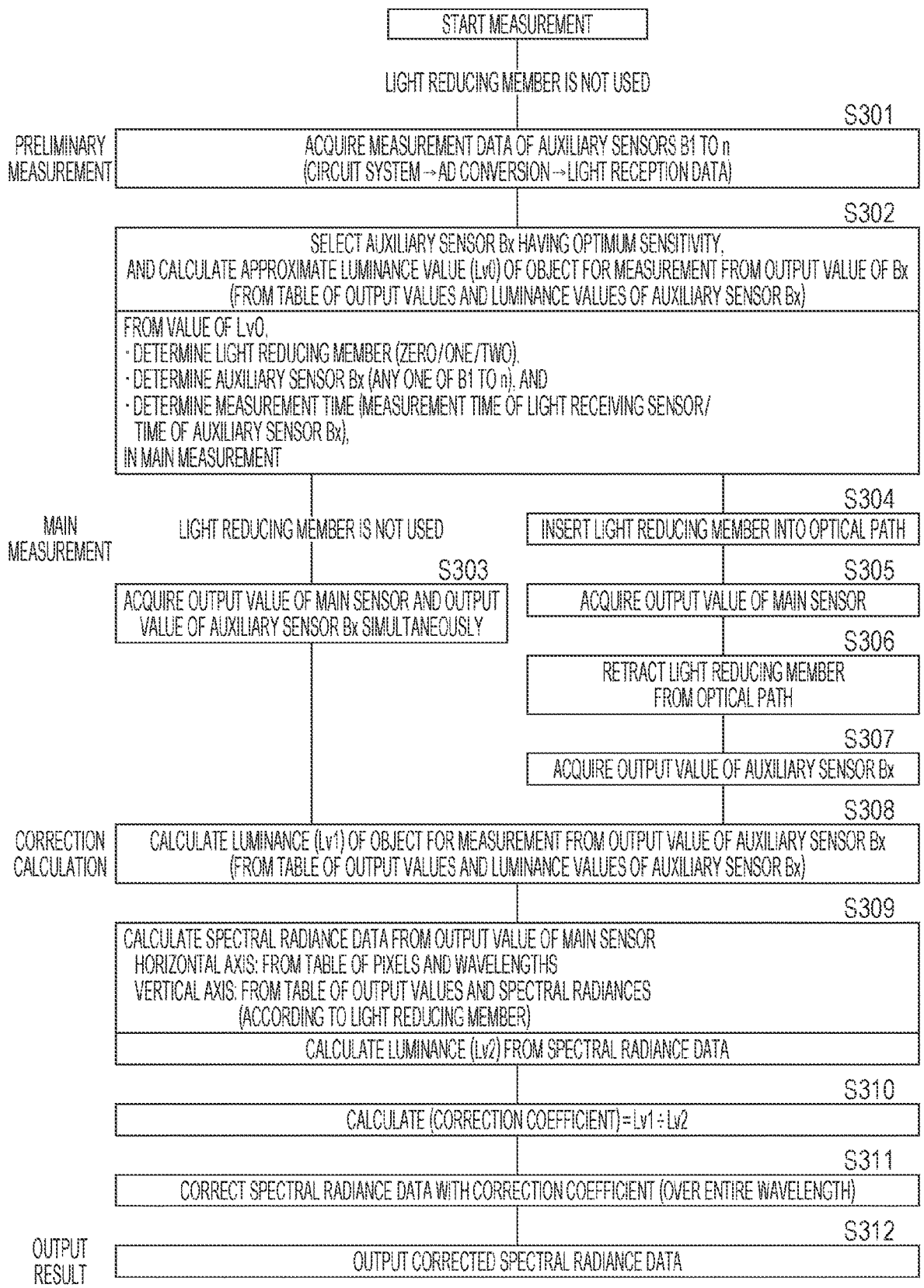
FIG. 10 is a diagram illustrating a flowchart of the correction processing according to the third embodiment.

FIG. 10 is a flowchart of a measurement procedure.

When the measurement is started, preliminary measurement is performed in a state where the light reducing member 520 is retracted from the optical path of the light being measured 820. That is, in step S301, the processing circuit 600 performs AD conversion on light reception data of the plurality of auxiliary sensors B1 to Bn to acquire measurement data. Next, in step S302, an auxiliary sensor Bx having optimum sensitivity is selected from the plurality of auxiliary sensors B1 to Bn, and an approximate luminance value (Lv0) of the object for measurement 2 is calculated from the output value of the auxiliary sensor Bx. The approximate luminance value (Lv0) is calculated by obtaining a luminance value corresponding to the output value of the auxiliary sensor Bx from the table of output values and luminance values (Lv) of the auxiliary sensor Bx. Further, from the calculated approximate luminance value (Lv0), whether or not the light reducing member 520 is used in the main measurement and the number of the light reducing members 520 used when used are determined, and an auxiliary sensor Bx to be used in the main measurement is determined from the auxiliary sensors B1 to Bn. Typically, the selected auxiliary sensor Bx is also used in the main measurement. Further, measurement times (accumulation times) of the main sensor 506 and the auxiliary sensor Bx in the main measurement are determined.

Next, the main measurement is performed. When it is determined that the light reducing member 520 is not used, the output value of the main sensor 506 and the output value of the auxiliary sensor Bx are simultaneously acquired with the light reducing member 520 being retracted from the optical path in step S303, and then, the processing proceeds to step S308. When it is determined to use the light reducing member 520, the determined number of light reducing members 520 is inserted into the optical path of the light being measured 820 in step S304, and then, the output value of the main sensor 506 is acquired in step S305. Next, after the light reducing member 520 is retracted from the optical path in step S306, the output value of the auxiliary sensor Bx is acquired in step S307, and the processing proceeds to step S308.

Next, correction calculation processes in steps S308 to S311 and a process of outputting the result in step S312 are performed. These processes are the same as the correction calculation processes in steps S104 to S107 and the process of outputting the result in step S108 in FIG. 6 described in the first embodiment except that the luminance (Lv1) of the object for measurement 2 is calculated using the output value of the auxiliary sensor Bx in step S308. Thus, the description thereof will be omitted.

As described above, in this embodiment, the auxiliary sensor B is disposed behind the light reducing member 520, and the output value of the main sensor 506 acquired in a state where the light reducing member 520 is inserted into the optical path of the light being measured 820 is corrected by the output value of the auxiliary sensor B acquired in a state where the light reducing member 520 is retracted from the optical path. Therefore, a change in transmittance of the light reducing member 520, a change in accuracy of the main sensor 506, and the like can be compensated for, whereby it is possible to perform highly accurate measurement. Note that, when the infrared cut filter 510 is present, a change in transmittance of the infrared cut filter 510 and the like can also be compensated for together.

Fourth Embodiment

Figure 11:
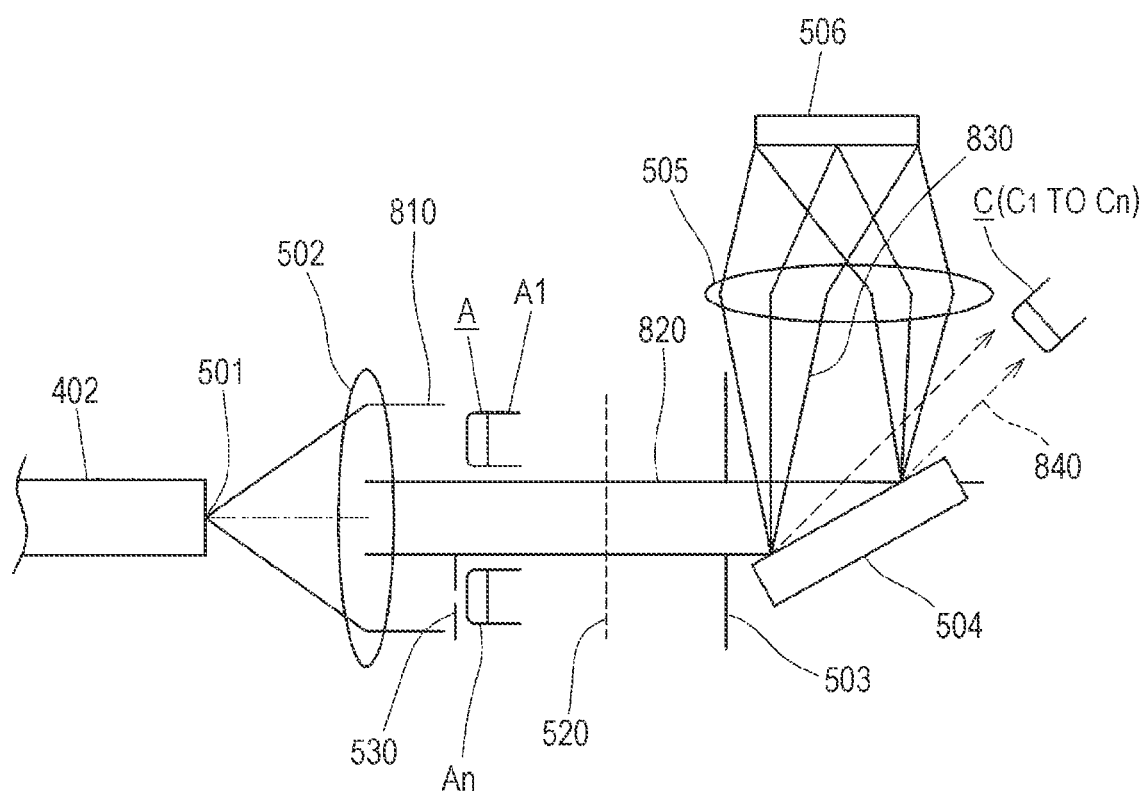
FIG. 11 is a diagram illustrating an arrangement example of auxiliary sensors during correction processing according to a fourth embodiment.

In this embodiment, as illustrated in FIG. 11, the auxiliary sensor B is disposed behind the light reducing member 520 driven so as to be insertable into and retractable from the optical path of the light being measured 820, in other words, between the light reducing member 520 and the diaphragm 503, or the auxiliary sensor C that receives the zeroth order diffracted light 840 is disposed. In this example, the auxiliary sensor C that receives the zeroth order diffracted light is used. One auxiliary sensor C may be used, or a plurality of auxiliary sensors C1 to Cn corresponding to a dynamic range may be used as in the present embodiment. In addition, one or a plurality of auxiliary sensors A disposed in front of the light reducing member 520 are also used. It does not matter whether the infrared cut filter 510 is provided or not. In the present embodiment, the infrared cut filter 510 is not provided. Each of the auxiliary sensors C1 to Cn and A is equipped with an optical filter, and has light sensitivity set to the standard luminous efficiency function (Vλ) in order to facilitate calculation. Note that each of the auxiliary sensors C1 to Cn and A may have sensitivity other than the standard luminous efficiency function (Vλ), and may not be equipped with an optical filter. In addition, a table of light reception values and luminance values (Lv) of the auxiliary sensor C is provided.

In this embodiment, the auxiliary sensor C acquires the absolute value of luminance, and corrects the level of the output value of the main sensor 506, as in the first embodiment. In addition, a temporal change is corrected by the auxiliary sensor A.

Figure 12:
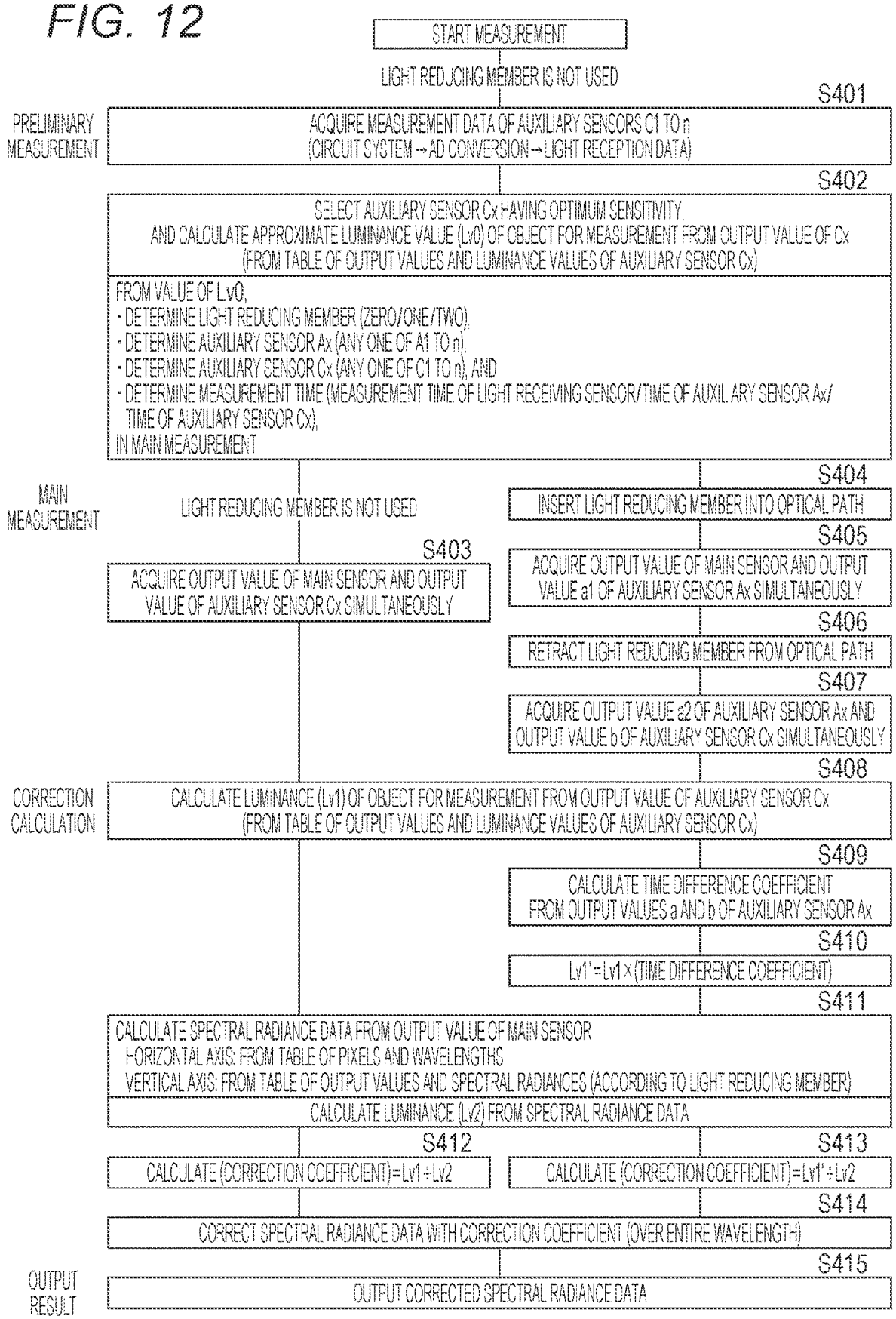
FIG. 12 is a diagram illustrating a flowchart of the correction processing according to the fourth embodiment.

FIG. 12 is a flowchart of a measurement procedure.

When the measurement is started, preliminary measurement is performed in a state where the light reducing member 520 is retracted from the optical path of the light being measured 820. That is, in step S401, the processing circuit 600 performs AD conversion on light reception data of the plurality of auxiliary sensors C1 to Cn to acquire measurement data. Next, in step S402, an auxiliary sensor Cx having optimum sensitivity is selected from the plurality of auxiliary sensors C1 to Cn, and an approximate luminance value (Lv0) of the object for measurement 2 is calculated from the output value of the auxiliary sensor Cx. The approximate luminance value (Lv0) is calculated by obtaining a luminance value corresponding to the output value of the auxiliary sensor Cx from the table of output values and luminance values (Lv) of the auxiliary sensor Cx. Further, from the calculated approximate luminance value (Lv0), whether or not the light reducing member 520 is used in the main measurement and the number of the light reducing members when used are determined, and an auxiliary sensor Ax and an auxiliary sensor Cx to be used in the main measurement are determined from the auxiliary sensors A1 to An and from the auxiliary sensors C1 to Cn, respectively. Typically, the selected auxiliary sensor Cx is also used in the main measurement. Further, measurement times (accumulation times) of the main sensor 506, the auxiliary sensor Ax, and the auxiliary sensor Cx in the main measurement are determined.

Next, the main measurement is performed. When it is determined that the light reducing member 520 is not used, the output value of the main sensor 506 and the output value of the auxiliary sensor Cx are simultaneously acquired with the light reducing member 520 being retracted from the optical path of the light being measured 820 in step S403, and then, the processing proceeds to step S408. When it is determined to use the light reducing member 520, the determined number of light reducing members 520 is inserted into the optical path in step S404, and then, the output value of the main sensor 506 and an output value a1 of the auxiliary sensor Ax are simultaneously acquired in step S405. Next, after the light reducing member 520 is retracted from the optical path in step S406, an output value a2 of the auxiliary sensor Ax and an output value b of the auxiliary sensor Cx are simultaneously acquired in step S407, and the processing proceeds to step S408.

Next, the following correction calculation processing is performed. First, in step S408, the luminance (Lv1) of the object for measurement is calculated from the output value of the auxiliary sensor Cx. The luminance (Lv1) is calculated on the basis of the table of output values and luminance values of the auxiliary sensor Cx.

Next, when the light reducing member 520 is not used, the processing proceeds to step S411. On the other hand, when the light reducing member 520 is used, a time difference count that is the ratio of the output values a1 and a2 is calculated from the output values a1 and a2 of the auxiliary sensor Ax in step S409, and an equation of Lv1'=Lv1×(time difference count) is calculated in step S410. Then, the processing proceeds to step S411.

In step S411, the spectral radiance data is calculated from the output value of the main sensor 506, and the luminance (Lv2) is calculated from the calculated spectral radiance data.

Next, when the light reducing member 520 is not used, an equation of (correction coefficient)=Lv1÷Lv2 is calculated in step S412, and then, the processing proceeds to step S414. On the other hand, when the light reducing member 520 is used, an equation of (correction coefficient)=Lv1'÷Lv2 is calculated in step S413, and then, the processing proceeds to step S414.

In step S414, the spectral radiance data is corrected with each correction coefficient over the entire wavelength. Then, in step S415, the corrected spectral radiance data is output.

As described above, in this embodiment, the output value of the main sensor 506 acquired in a state where the light reducing member 520 is inserted into the optical path is corrected by the output value of the auxiliary sensor Cx acquired in a state where the light reducing member 520 is retracted from the optical path of the light being measured 820, and a temporal change of light quantity due to the difference between the acquisition timing of the auxiliary sensor Cx and the timing at which the output value of the main sensor 506 is acquired is corrected by the time difference count (temporal rate of change of light quantity) which is the ratio of the output values a1 and a2 of the auxiliary sensor Ax measured at the respective timings, so that it is possible to perform highly accurate measurement. Note that, when the infrared cut filter 510 is present behind the auxiliary sensor Ax, a change in transmittance, etc. of the infrared cut filter 510 and a change in transmittance, etc. of the light reducing member 520 can be compensated for together.

Fifth Embodiment

Figure 13:
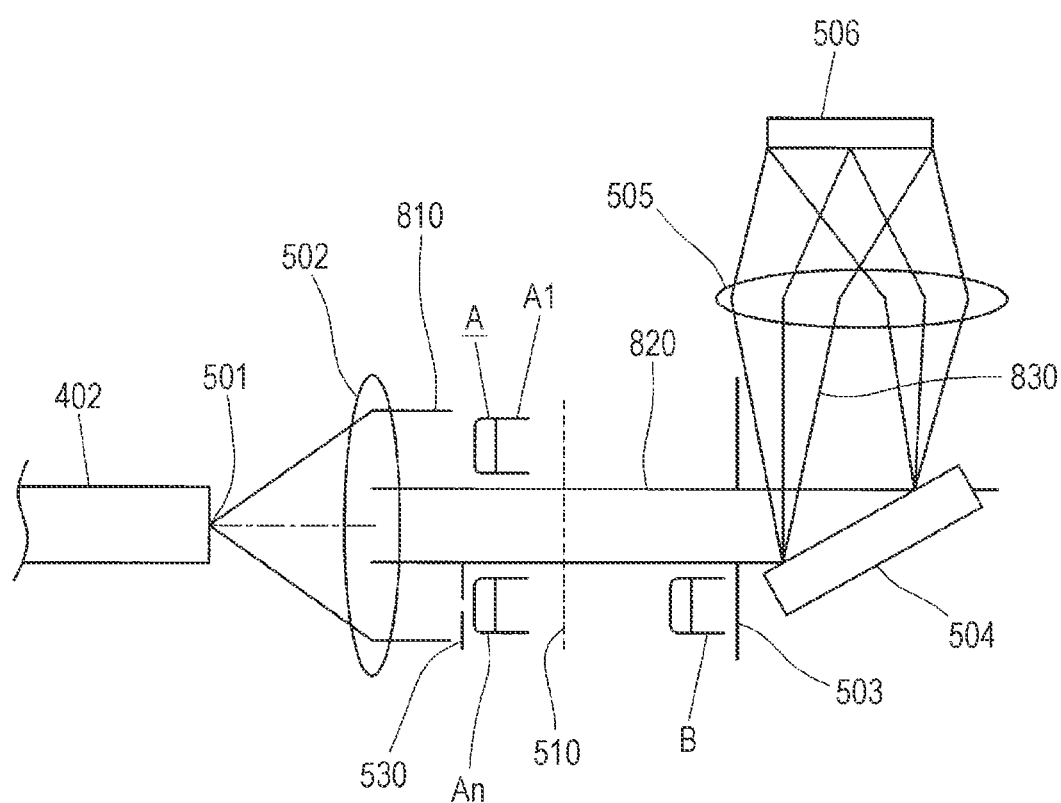
FIG. 13 is a diagram illustrating an arrangement example of auxiliary sensors during correction processing according to a fifth embodiment.

In the present embodiment, as illustrated in FIG. 13, the auxiliary sensor A is disposed between the collimator lens 502 and the infrared cut filter 510, and one auxiliary sensor B is disposed behind the infrared cut filter 510. It does not matter whether the light reducing member 520 is provided or not. In the present embodiment, the light reducing member 520 is not provided. One auxiliary sensor A may be used, or a plurality of auxiliary sensors A1 to An corresponding to a dynamic range may be used as in this embodiment. A sensor set to an appropriate quantity of light is used as the auxiliary sensor B, because the auxiliary sensor B is located behind the infrared cut filter 510. Instead of the auxiliary sensor B, one auxiliary sensor C that receives the zeroth order diffracted light may be used.

Each of the auxiliary sensors A1 to An is equipped with an optical filter, and has light sensitivity set to the standard luminous efficiency function (Vλ) in order to facilitate calculation. Note that each of the auxiliary sensors A1 to An may have sensitivity other than the standard luminous efficiency function (Vλ), and may not be equipped with an optical filter. In addition, a table of light reception values and luminance values (Lv) of the auxiliary sensor A is provided. Further, a reference value (referred to as a reference auxiliary sensor ratio) of a ratio between an output value of the auxiliary sensor A and an output value of the auxiliary sensor B (output value of the auxiliary sensor C when the auxiliary sensor C is used) is stored at the time of shipment from a factory.

In the present embodiment, a change in transmittance of the infrared cut filter 510 from the time of shipment from the factory is compensated for on the basis of the reference auxiliary sensor ratio between the auxiliary sensors A1 to An in front of the infrared cut filter 510 and the auxiliary sensor B behind the infrared cut filter 510.

Figure 14:
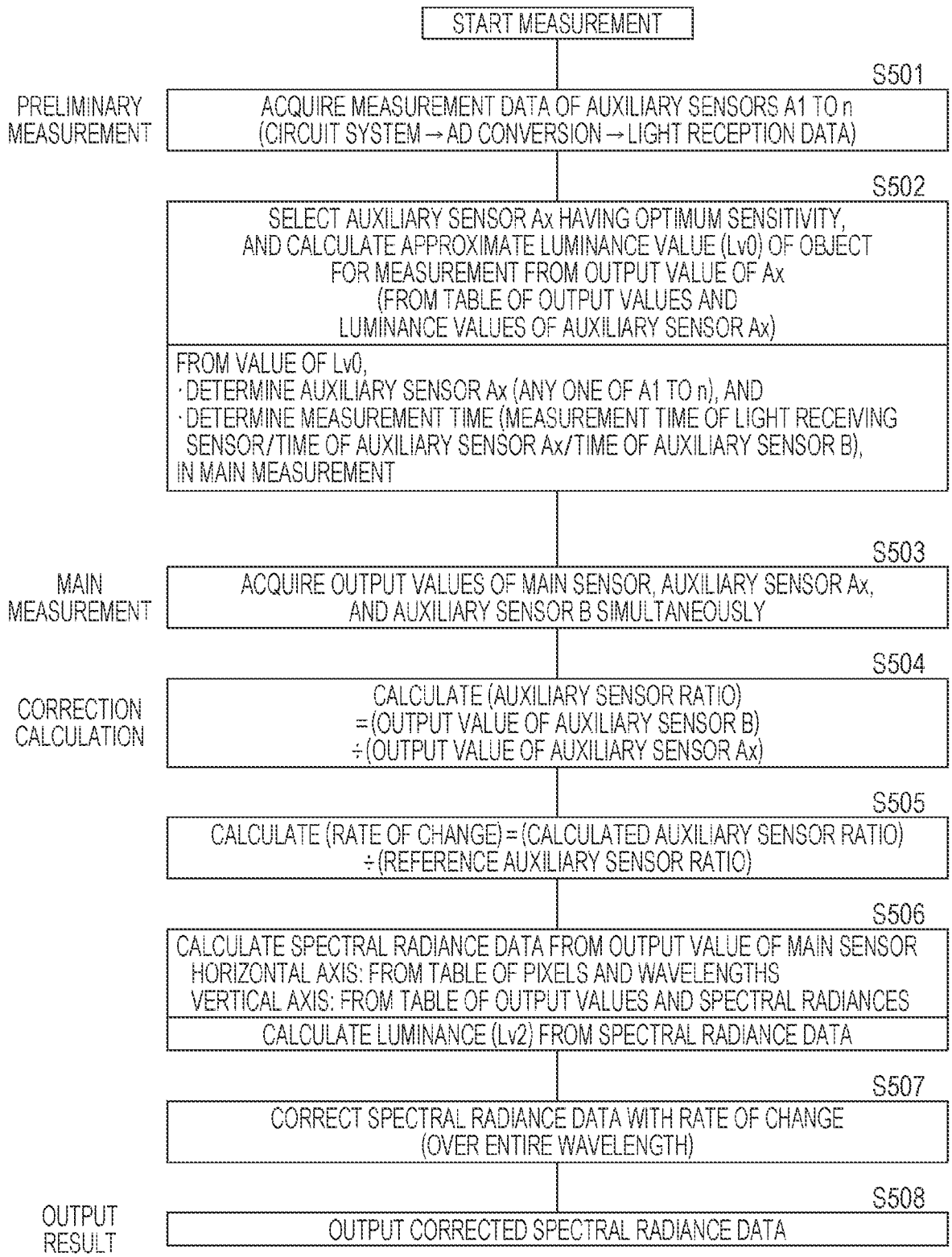
FIG. 14 is a diagram illustrating a flowchart of the correction processing according to the fifth embodiment.

FIG. 14 is a flowchart of a measurement procedure.

When the measurement is started, as preliminary measurement, the processing circuit 600 performs AD conversion on the light reception data of the plurality of auxiliary sensors A1 to An to acquire measurement data in step S501. Next, in step S502, an auxiliary sensor Ax having optimum sensitivity is selected from the plurality of auxiliary sensors A1 to An, and an approximate luminance value (Lv0) of the object for measurement 2 is calculated from the output value of the auxiliary sensor Ax. The approximate luminance value (Lv0) is calculated by obtaining a luminance value corresponding to the output value of the auxiliary sensor Ax from the table of output values and luminance values (Lv) of the auxiliary sensor Ax. Further, an auxiliary sensor Ax to be used in main measurement is determined from among the auxiliary sensors A1 to An on the basis of the calculated approximate luminance value (Lv0). Typically, the selected auxiliary sensor Ax is also used in the main measurement. Further, measurement times (accumulation times) of the main sensor 506, the auxiliary sensor Ax, and the auxiliary sensor B in the main measurement are determined.

Next, the main measurement is performed in step S503. Specifically, output values of the main sensor 506, the auxiliary sensor Ax, and the auxiliary sensor B are simultaneously acquired.

Next, the following correction calculation processing is performed. First, in step S504, an equation of (auxiliary sensor ratio)=(output value of the auxiliary sensor B)÷(output value of the auxiliary sensor Ax) is calculated, and then in step S505, an equation of (rate of change)=(calculated auxiliary sensor ratio)÷(reference auxiliary sensor ratio at the time of shipment from the factory) is calculated.

Next, in step S506, spectral radiance data is calculated from the output value of the main sensor 506. The horizontal axis of the spectral radiance data is calculated from the table of pixels and wavelengths, and the vertical axes are calculated from the table of output values and spectral radiances. Then, luminance (Lv2) is calculated from the calculated spectral radiance data.

In step S507, the spectral radiance data is corrected over the entire wavelength using the rate of change calculated in step S505. Then, in step S508, the corrected spectral radiance data is output.

As described above, in the present embodiment, a change in transmittance or the like of the infrared cut filter 510 from the time of shipment from the factory is corrected using a rate of change on the basis of the output values of the auxiliary sensor Ax in front of the infrared cut filter 510 and the auxiliary sensor B behind the infrared cut filter 510, and the output value of the main sensor 506 is corrected on the basis of the corrected rate of change. Therefore, even in a case where the transmittance or the like of the infrared cut filter 510 has changed due to environmental conditions, time degradation, or the like, it is possible to perform highly accurate measurement. When the infrared cut filter 510 is not provided and the fixed light reducing member 520 is provided, a change in transmittance of the light reducing member 520 can be compensated for. In addition, when both the infrared cut filter 510 and the light reducing member 520 are present between the auxiliary sensors A1 to An and the auxiliary sensor B, a change in transmittance or the like of the infrared cut filter 510 and the light reducing member 520 together can be compensated for.

Sixth Embodiment

Figure 15:
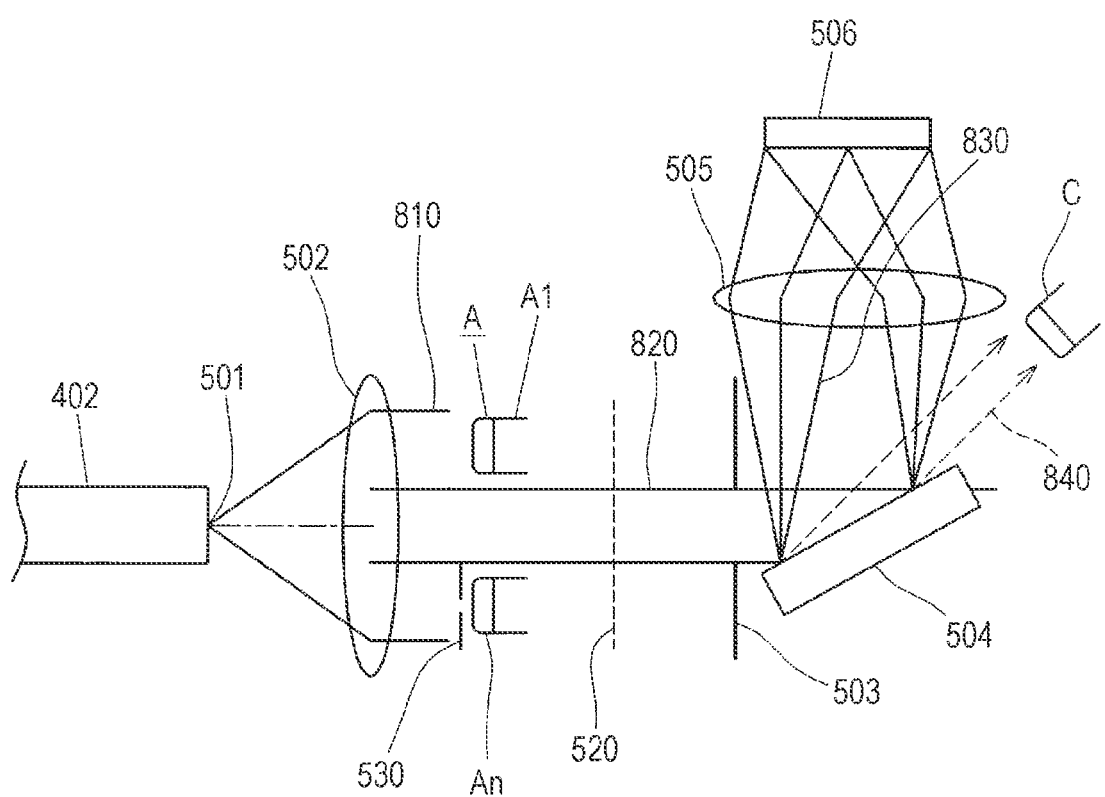
FIG. 15 is a diagram illustrating an arrangement example of auxiliary sensors during correction processing according to a sixth embodiment.

In this embodiment, as illustrated in FIG. 15, the auxiliary sensor A is disposed in front of the light reducing member 520 which is driven to be insertable into and retractable from the optical path of the light being measured 820, and further, one auxiliary sensor C that receives the zeroth order diffracted light 840 is disposed. One auxiliary sensor A may be used, or a plurality of auxiliary sensors A1 to An corresponding to a dynamic range may be used as in this embodiment. A sensor set to an appropriate quantity of light is used as the auxiliary sensor C, because the auxiliary sensor C is located behind the light reducing member 520. Instead of the auxiliary sensor C, the auxiliary sensor B disposed between the light reducing member 520 and the diaphragm 503 may be used. It does not matter whether the infrared cut filter 510 is provided or not. In the present embodiment, the infrared cut filter 510 is not provided.

The auxiliary sensor A is equipped with an optical filter, and has light sensitivity set to the standard luminous efficiency function (Vλ) in order to facilitate calculation. Note that each of the auxiliary sensors C1 to Cn and A may have sensitivity other than the standard luminous efficiency function (Vλ), and may not be equipped with an optical filter. In addition, a table of light reception values and luminance values (Lv) of the auxiliary sensor A is provided. Further, a reference value of a ratio between an output value of the auxiliary sensor A and an output value of the auxiliary sensor C (reference auxiliary sensor ratio) is stored at the time of shipment from a factory.

In the present embodiment, a change in transmittance of the light reducing member 520 from the time of shipment from the factory is compensated for on the basis of the reference auxiliary sensor ratio between the auxiliary sensors A1 to An in front of the light reducing member 520 and the auxiliary sensor C behind.

Figure 16:
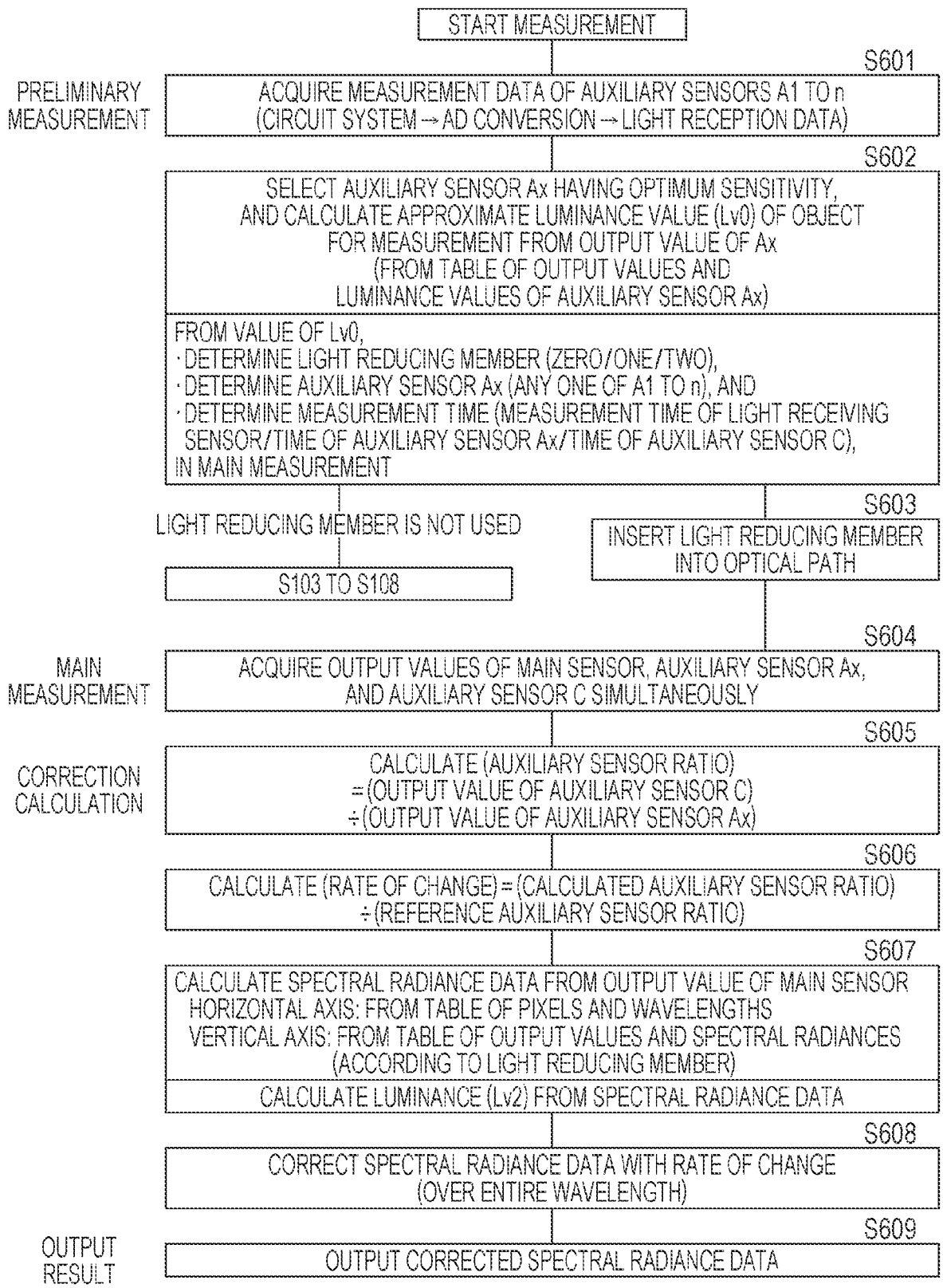
FIG. 16 is a diagram illustrating a flowchart of the correction processing according to the sixth embodiment.

FIG. 16 is a flowchart of a measurement procedure.

When the measurement is started, as preliminary measurement, the processing circuit 600 performs AD conversion on the light reception data of the plurality of auxiliary sensors A1 to An to acquire measurement data in step S601. Next, in step S602, an auxiliary sensor Ax having optimum sensitivity is selected from the plurality of auxiliary sensors A1 to An, and an approximate luminance value (Lv0) of the object for measurement 2 is calculated from the output value of the auxiliary sensor Ax. The approximate luminance value (Lv0) is calculated by obtaining a luminance value corresponding to the output value of the auxiliary sensor Ax from the table of output values and luminance values (Lv) of the auxiliary sensor Ax. Further, from the calculated approximate luminance value (Lv0), whether or not the light reducing member 520 is used in the main measurement and the number of the light reducing members when used are determined, and an auxiliary sensor Ax to be used in the main measurement is determined from the auxiliary sensors A1 to An. Typically, the selected auxiliary sensor Ax is also used in the main measurement. Further, measurement times (accumulation times) of the main sensor 506, the auxiliary sensor Ax, and the auxiliary sensor C in the main measurement are determined.

Next, correction calculation processes in steps S605 to S608 and a process of outputting the result in step S609 are performed. These processes are the same as the correction calculation processes in steps S504 to S507 and the process of outputting the result in step S508 in FIG. 14 described in the fifth embodiment except that the auxiliary sensor ratio is calculated using the output value of the auxiliary sensor C instead of the output value of the auxiliary sensor B in step S605. Thus, the description thereof will be omitted.

In step S604, output values of the main sensor 506, the auxiliary sensor Ax, and the auxiliary sensor C are simultaneously acquired.

Next, correction calculation processes in steps S605 to S608 and a process of outputting the result in step S609 are performed. These processes are the same as the correction calculation processes in steps S504 to S507 and the process of outputting the result in step S508 in FIG. 11 described in the fifth embodiment except that the auxiliary sensor ratio is calculated using the output value of the auxiliary sensor C instead of the output value of the auxiliary sensor B in step S605. Thus, the description thereof will be omitted.

As described above, in the present embodiment, a change in transmittance or the like of the light reducing member 520 from the time of shipment from the factory is corrected using a rate of change on the basis of the output values of the auxiliary sensor Ax in front of the light reducing member 520 and the auxiliary sensor C behind, and the output value of the main sensor 506 is corrected on the basis of the corrected rate of change. Therefore, even in a case where the transmittance or the like of the light reducing member 520 has changed due to environmental conditions, time degradation, or the like, it is possible to perform highly accurate measurement. When the infrared cut filter 510 is located between the auxiliary sensor Ax and the light reducing member 520, a change in transmittance or the like of the infrared cut filter 510 and the light reducing member 520 together can be compensated for.

Seventh Embodiment

Figure 17:
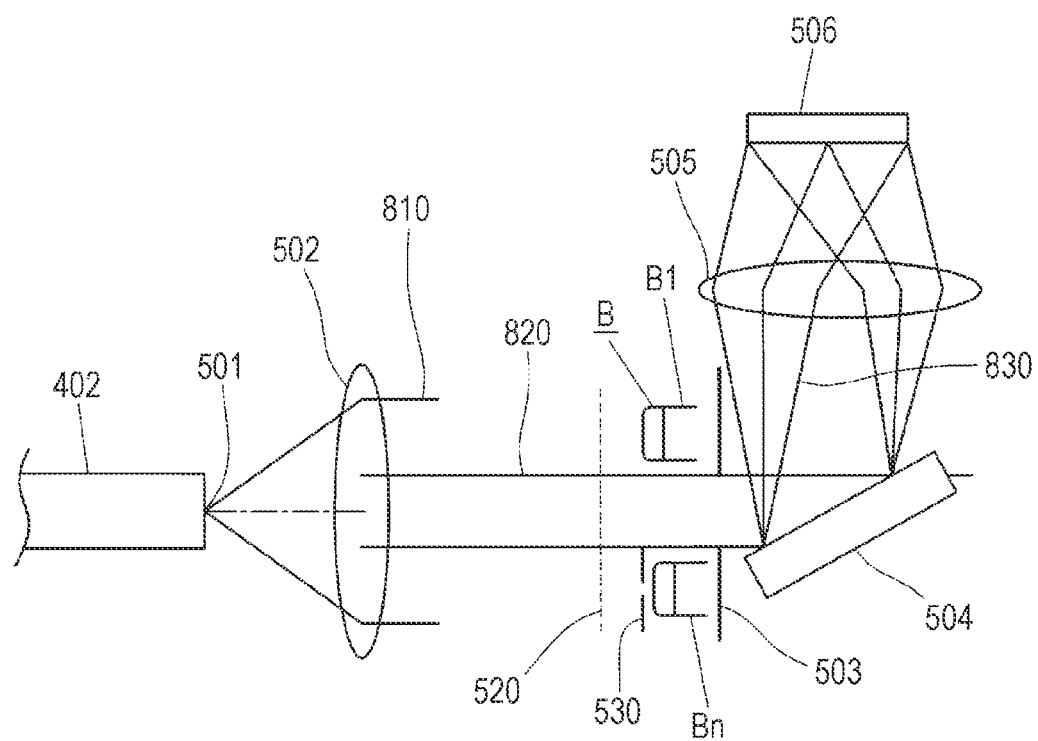
FIG. 17 is a diagram illustrating an arrangement example of auxiliary sensors during correction processing according to a seventh embodiment.

In this embodiment, as illustrated in FIG. 17, the auxiliary sensor B is disposed behind the light reducing member 520 which is driven to be insertable into and retractable from the optical path of the light being measured 820. One auxiliary sensor B may be used, or a plurality of auxiliary sensors B1 to Bn corresponding to the dynamic range may be used as in this embodiment. Instead of the auxiliary sensor B, the auxiliary sensor C that receives the zeroth order diffracted light 840 may be used. It does not matter whether the infrared cut filter 510 is provided or not. In the present embodiment, the infrared cut filter 510 is not provided.

The auxiliary sensor B is equipped with an optical filter, and has light sensitivity set to the standard luminous efficiency function (Vλ) in order to facilitate calculation. Note that each of the auxiliary sensors C1 to Cn and A may have sensitivity other than the standard luminous efficiency function (Vλ), and may not be equipped with an optical filter. In addition, a table of light reception values and luminance values (Lv) of the auxiliary sensor B is provided.

In the present embodiment, a light reduction ratio of the light reducing member 520 is obtained from a ratio between an output value of the auxiliary sensor B when the light reducing member 520 is inserted into the optical path and an output value of the auxiliary sensor B when the light reducing member 520 is retracted from the optical path, and the correction is performed.

Figure 18:
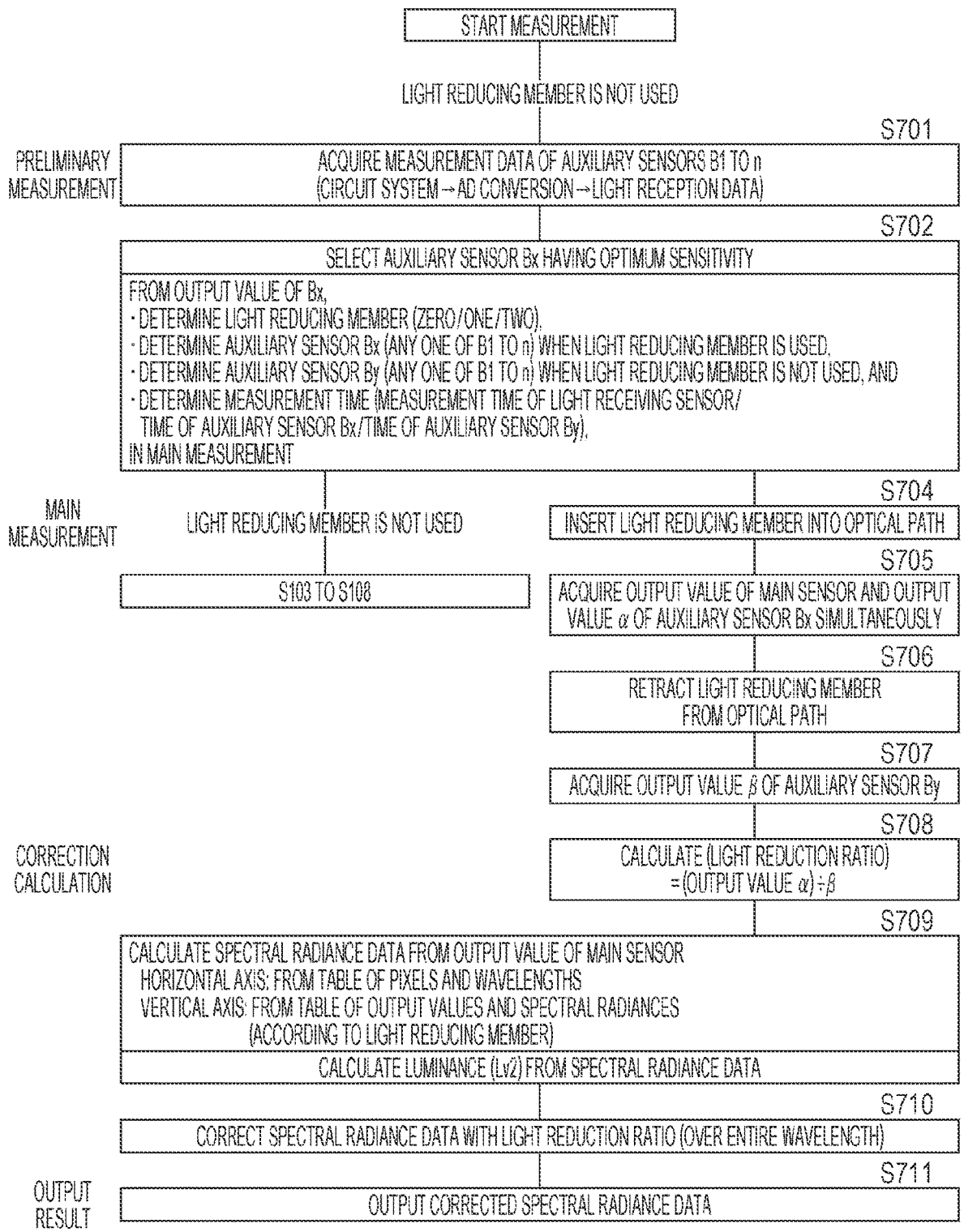
FIG. 18 is a diagram illustrating a flowchart of the correction processing according to the seventh embodiment.

FIG. 18 is a flowchart of a measurement procedure.

When the measurement is started, preliminary measurement is performed in a state where the light reducing member 520 is retracted from the optical path of the light being measured 820. That is, in step S701, the processing circuit 600 performs AD conversion on light reception data of the plurality of auxiliary sensors B1 to Bn to acquire measurement data. Next, in step S702, an auxiliary sensor Bx having optimum sensitivity is selected from the plurality of auxiliary sensors B1 to Bn. Further, on the basis of the output value of the auxiliary sensor Bx, whether or not the light reducing member 520 is used in the main measurement and the number of the light reducing members when used are determined, and further, an auxiliary sensor Bx to be used in the main measurement when the light reducing member is used, and an auxiliary sensor By to be used in the main measurement when the light reducing member is not used are determined from the auxiliary sensors B1 to Bn. The auxiliary sensor Bx and the auxiliary sensor By may be the same. Further, measurement times (accumulation times) of the main sensor 506, the auxiliary sensor Bx, and the auxiliary sensor By in the main measurement are determined.

Next, the main measurement is performed. When it is determined not to use the light reducing member 520, the processes of steps S103 to S108 in FIG. 6 are performed with the light reducing member 520 being retracted from the optical path of the light being measured 820. However, the "auxiliary sensor Ax" in steps S103 and S104 is replaced with the "auxiliary sensor Bx".

When it is determined to use the light reducing member 520, the determined number of light reducing members 520 is inserted into the optical path in step S704, and then, the output value of the main sensor 506 and an output value a of the auxiliary sensor Bx are simultaneously acquired in step S705. Next, after the light reducing member 520 is retracted from the optical path in step S706, an output value β of the auxiliary sensor By is acquired in step S707.

Next, the following correction calculation processing is performed. First, in step S708, an equation of (light reduction ratio)=(output value α)÷β is calculated, and then the processing proceeds to step S709. Next, in step S709, spectral radiance data is calculated from the output value of the main sensor 506. Then, luminance (Lv2) is calculated from the calculated spectral radiance data.

In step S710, the spectral radiance data is corrected over the entire wavelength using the light reduction ratio calculated in step S708. Then, in step S711, the corrected spectral radiance data is output.

As described above, in the present embodiment, the light reduction ratio of the light reducing member 520 is obtained on the basis of the output values of the auxiliary sensors Bx and By disposed behind the light reducing member 520, a change in transmittance or the like is corrected by the light reduction ratio, and the output value of the main sensor is corrected on the basis of the light reduction ratio. Therefore, even in a case where the transmittance or the like of the light reducing member 520 has changed due to environmental conditions, time degradation, or the like, it is possible to perform highly accurate measurement.

Eighth Embodiment

Figure 19:
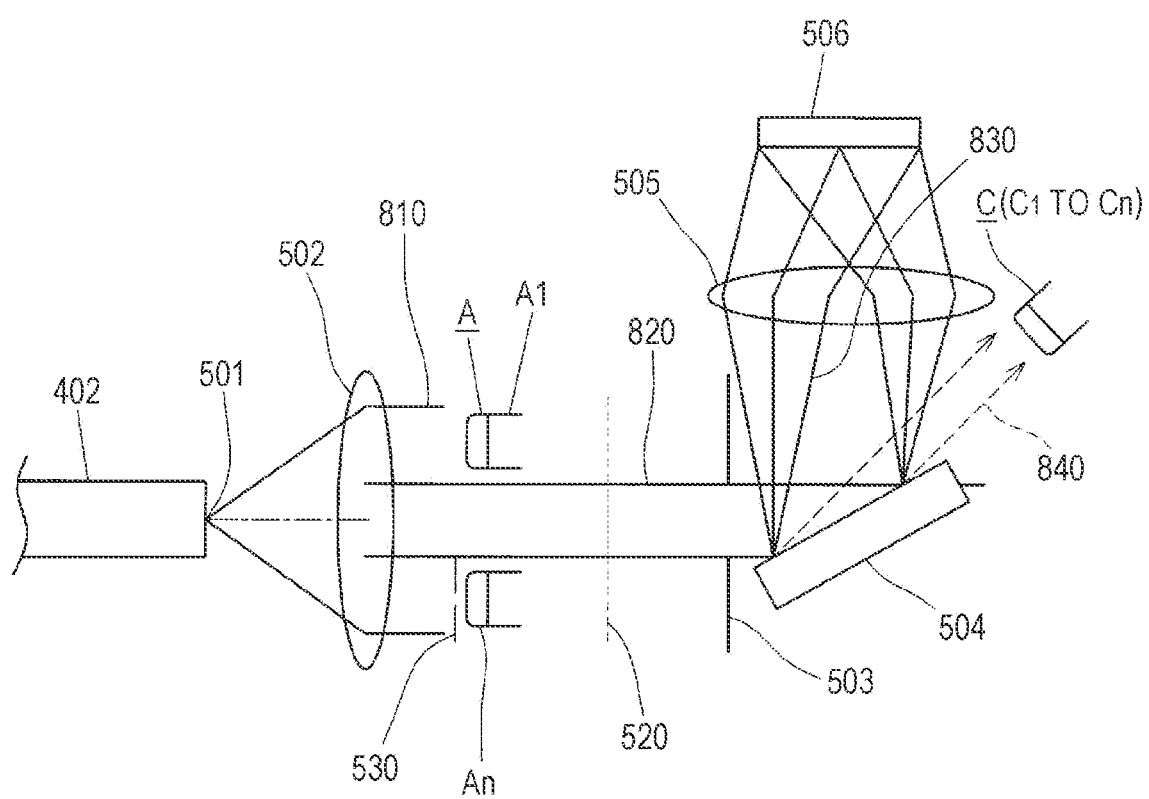
FIG. 19 is a diagram illustrating an arrangement example of auxiliary sensors during correction processing according to an eighth embodiment.

In this embodiment, as illustrated in FIG. 19, the auxiliary sensor B is disposed between the light reducing member 520 driven so as to be insertable into and retractable from the optical path of the light being measured 820 and the diaphragm 503, or the auxiliary sensor C that receives the zeroth order diffracted light 840 is disposed. In this example, the auxiliary sensor C that receives the zeroth order diffracted light 840 is used. One auxiliary sensor C may be used, or a plurality of auxiliary sensors C1 to Cn corresponding to a dynamic range may be used as in the present embodiment. In addition, one or a plurality of auxiliary sensors A1 to An disposed in front of the light reducing member 520 are also used. It does not matter whether the infrared cut filter 510 is provided or not. In the present embodiment, the infrared cut filter 510 is not provided.

The auxiliary sensor C is equipped with an optical filter, and has light sensitivity set to the standard luminous efficiency function (Vλ) in order to facilitate calculation. Note that the auxiliary sensor C may have sensitivity other than the standard luminous efficiency function (Vλ), and may not be equipped with an optical filter. In addition, a table of light reception values and luminance values (Lv) of the auxiliary sensor C is provided.

In the present embodiment, a light reduction ratio of the light reducing member 520 is obtained from a ratio between an output value of the auxiliary sensor C when the light reducing member 520 is inserted into the optical path of the light being measured 820 and an output value of the auxiliary sensor C when the light reducing member 520 is retracted from the optical path, and the correction is performed. In addition, a temporal change is corrected by the auxiliary sensor A.

Figure 20:
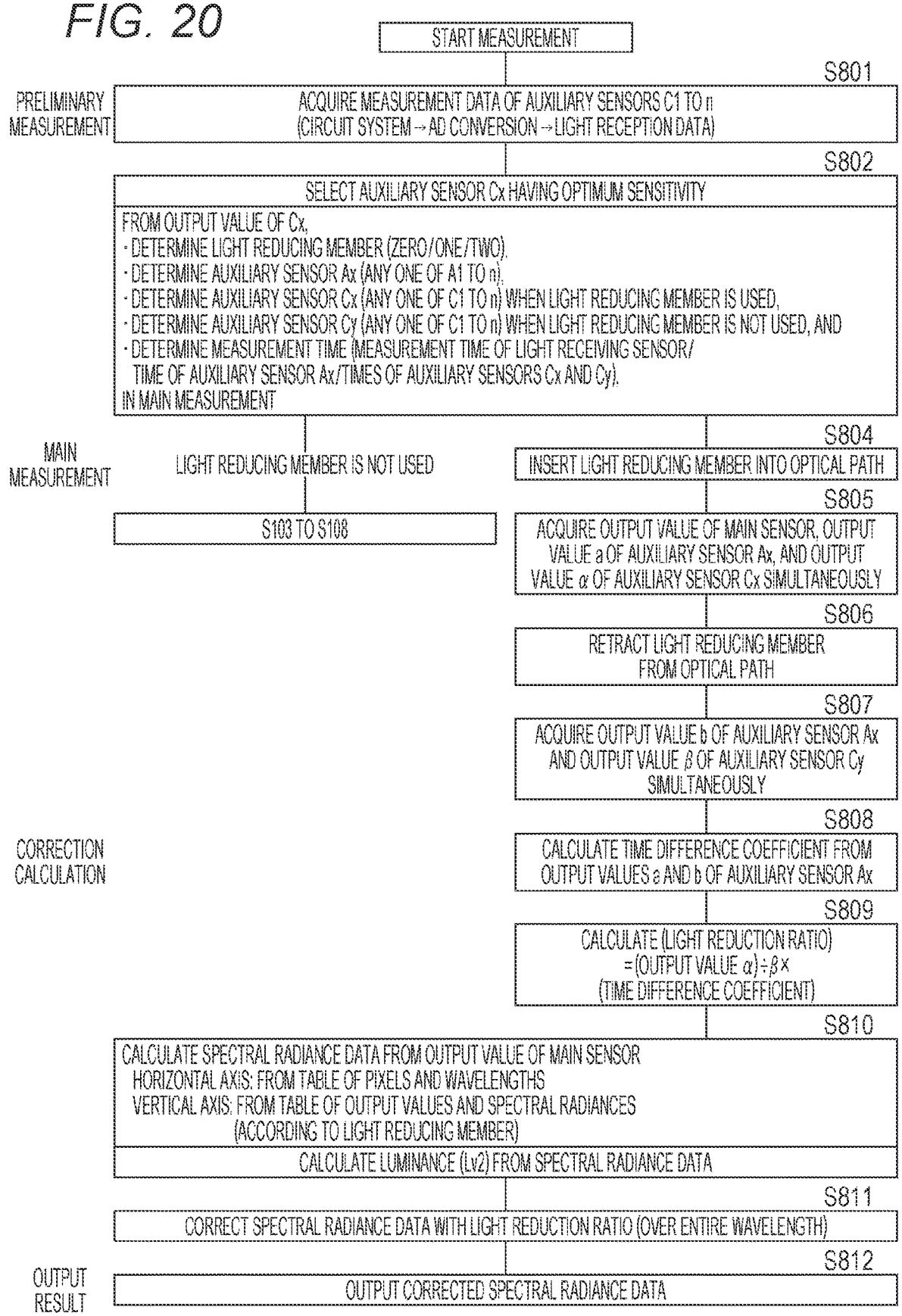
FIG. 20 is a diagram illustrating a flowchart of the correction processing according to the eighth embodiment.

FIG. 20 is a flowchart of a measurement procedure.

When the measurement is started, preliminary measurement is performed in a state where the light reducing member 520 is retracted from the optical path of the light being measured 820. That is, in step S801, the processing circuit 600 performs AD conversion on light reception data of the plurality of auxiliary sensors C1 to Cn to acquire measurement data. Next, in step S802, an auxiliary sensor Cx having optimum sensitivity is selected from the plurality of auxiliary sensors C1 to Cn. Further, on the basis of the output value of the auxiliary sensor Cx, whether or not the light reducing member 520 is used in the main measurement and the number of the light reducing members when used are determined, and further, an auxiliary sensor Ax to be used in the main measurement is determined from the auxiliary sensors A1 to An, and an auxiliary sensor Cx to be used in the main measurement when the light reducing member is used, and an auxiliary sensor Cy to be used in the main measurement when the light reducing member is not used are determined from the auxiliary sensors C1 to Cn. The auxiliary sensor Cx and the auxiliary sensor Cy may be the same. Further, measurement times (accumulation times) of the main sensor 506, the auxiliary sensor Ax, the auxiliary sensor Cx, and the auxiliary sensor Cy in the main measurement are determined.

Next, the main measurement is performed. When it is determined not to use the light reducing member 520, the processes of steps S103 to S108 in FIG. 6 are performed with the light reducing member 520 being retracted from the optical path of the light being measured 820. However, the "auxiliary sensor Ax" in steps S103 and S104 is replaced with the "auxiliary sensor Cx".

When it is determined to use the light reducing member 520, the determined number of light reducing members 520 is inserted into the optical path in step S804, and then, the output value of the main sensor 506, an output value a of the auxiliary sensor Ax, and an output value a of the auxiliary sensor Cx are simultaneously acquired in step S805. Next, after the light reducing member 520 is retracted from the optical path in step S806, an output value b of the auxiliary sensor Ax and an output value β of the auxiliary sensor Cy are simultaneously acquired in step S807.

Next, the following correction calculation processing is performed. First, in step S808, a time difference count that is a ratio between the output values a and b of the auxiliary sensor Ax is calculated from the output values a and b, and in step S809, an equation of (light reduction ratio)=(output value α)÷β×(time difference coefficient) is calculated. Then, the processing proceeds to step S810.

In step S810, spectral radiance data is calculated from the output value of the main sensor 506. Then, luminance (Lv2) is calculated from the calculated spectral radiance data.

In step S811, the spectral radiance data is corrected over the entire wavelength using the light reduction ratio calculated in step S809. Then, in step S812, the corrected spectral radiance data is output.

As described above, in the present embodiment, the light reduction ratio of the light reducing member 520 is obtained on the basis of the output values of the auxiliary sensors Cx and Cy disposed behind the light reducing member 520, a change in transmittance or the like is corrected by the light reduction ratio, and the output value of the main sensor 506 is corrected on the basis of the light reduction ratio. Therefore, even in a case where the transmittance or the like of the light reducing member 520 has changed due to environmental conditions, time degradation, or the like, it is possible to perform highly accurate measurement. Moreover, in the light reduction ratio, a temporal change in light quantity is corrected using the time difference coefficient that is the ratio between the output values a and b of the auxiliary sensor Ax measured at different timings, and thus, it is possible to perform more highly accurate measurement.

INDUSTRIAL APPLICABILITY

The present invention can be used for measuring luminance and chromaticity of a light source, spectral reflectance or a color value of an object, and the like.

REFERENCE SIGNS LIST 1 spectrometer
2 object for measurement
3 luminous flux
100 light receiving optical system
200 observation optical system
300 measurement optical system
400 light guide unit
402 bundle fiber
500 spectroscopic unit
501 entrance slit
502 collimator lens
503 diaphragm
503a opening
504 diffraction grating
506 main sensor
510 infrared cut filter
520 light reducing member
600 processing circuit
700 correction unit
810 light having passed through collimator lens
820 light being measured
840 zeroth order diffracted light
A to C, A1 to An, B1 to Bn, C1 to Cn auxiliary sensor

The invention claimed is:

1. A spectrometer comprising:
a diffraction part that diffracts light being measured which has entered via an entrance part;
a main sensor that receives the light being measured which has been diffracted by the diffraction part;
a first auxiliary sensor and a second auxiliary sensor respectively disposed in an optical path of a luminous flux that does not reach the main sensor among luminous fluxes that have entered via the entrance part, the first and second auxiliary sensors receiving the luminous flux;
a corrector that corrects an output value of the main sensor on the basis of an output value of the auxiliary sensor; and
a received-light-quantity adjustment member for adjusting a quantity of light received by the main sensor,
wherein the first auxiliary sensor and the second auxiliary sensor are respectively disposed in front of and behind the received-light-quantity adjustment member, and
the corrector simultaneously acquires output values of the main sensor, the first auxiliary sensor, and the second auxiliary sensor, and corrects the output value of the main sensor on the basis of a rate of change of a ratio between the acquired output values of the first auxiliary sensor and the second auxiliary sensor from a reference value.

2. The spectrometer according to claim 1, wherein the corrector corrects the output value of the main sensor such that a received light intensity value calculated from the output value of the main sensor is equal to a received light intensity value calculated from the output value of the auxiliary sensor.

3. The spectrometer according to claim 1, wherein the received-light-quantity adjustment member is a light reducing member disposed to be insertable into and retractable from an optical path of the light being measured.

4. The spectrometer according to claim 1, wherein the auxiliary sensor receives a luminous flux that is not emitted to the diffraction part among luminous fluxes that have entered via the entrance part.

5. A spectrometer comprising:
a diffraction part that diffracts light being measured which has entered via an entrance part;
a main sensor that receives the light being measured which has been diffracted by the diffraction part;
at least one auxiliary sensor disposed in an optical path of a luminous flux that does not reach the main sensor among luminous fluxes that have entered via the entrance part, the auxiliary sensor receiving the luminous flux from an object for measurement;
a corrector that corrects an output value of the main sensor on the basis of an output value of the auxiliary sensor; and
a received-light-quantity adjustment member for adjusting a quantity of light received by the main sensor,
wherein the auxiliary sensor is disposed in front of the received-light-quantity adjustment member, and the corrector simultaneously acquires the output value of the main sensor and the output value of the auxiliary sensor, and corrects the output value of the main sensor.

6. The spectrometer according to claim 5, wherein the auxiliary sensor receives a luminous flux that is not emitted to the diffraction part among luminous fluxes that have entered via the entrance part.

7. The spectrometer according to claim 5, wherein the auxiliary sensor receives zeroth order diffracted light.

8. The spectrometer according to claim 5, wherein the auxiliary sensor includes a plurality of auxiliary sensors having different light quantity ranges of receivable light.

9. The spectrometer according to claim 5, further comprising an aperture stop that controls a quantity of light received by the auxiliary sensor.

10. The spectrometer according to claim 5, further comprising an optical filter that controls a quantity of light received by the auxiliary sensor.

11. The spectrometer according to claim 5, wherein the auxiliary sensor includes an optical filter having light sensitivity set to a standard luminous efficiency function.

12. The spectrometer according to claim 5, wherein the corrector corrects the output value of the main sensor such that a received light intensity value calculated from the output value of the main sensor is equal to a received light intensity value calculated from the output value of the auxiliary sensor.

13. The spectrometer according to claim 5, wherein the received-light-quantity adjustment member is a light reducing member disposed to be insertable into and retractable from an optical path of the light being measured.

14. A spectrometer comprising:
a diffraction part that diffracts light being measured which has entered via an entrance part;
a main sensor that receives the light being measured which has been diffracted by the diffraction part;
a first auxiliary sensor disposed in an optical path of a luminous flux that does not reach the main sensor among luminous fluxes that have entered via the entrance part, the first auxiliary sensor receiving the luminous flux; and
a corrector that corrects an output value of the main sensor on the basis of an output value of the auxiliary sensor; and
a received-light-quantity adjustment member for adjusting a quantity of light received by the main sensor,
wherein the received-light-quantity adjustment member is a light reducing member disposed to be insertable into and retractable from an optical path of the light being measured,
the first auxiliary sensor is disposed behind the light reducing member, and
the corrector simultaneously acquires the output value of the main sensor and an output value of the first auxiliary sensor in a state where the light reducing member is inserted into the optical path, acquires an output value of the first auxiliary sensor in a state where the light reducing member is retracted from the optical path, and corrects the output value of the main sensor on the basis of a ratio of the acquired output values of the first auxiliary sensor.

15. The spectrometer according to claim 14, wherein a second auxiliary sensor is disposed in front of the light reducing member, and
the corrector acquires twice an output value of the second auxiliary sensor at timings same as the timings at which the output values of the first auxiliary sensor are acquired, calculates a temporal rate of change of light quantity from a ratio of the acquired two output values of the second auxiliary sensor, and corrects a temporal change in light quantity on the basis of the calculated rate of change of light quantity.

* * * * *